US012709006B2

(12) United States Patent
Gray et al.

(10) Patent No.: US 12,709,006 B2
(45) Date of Patent: Aug. 18, 2026

(54) METHOD AND SYSTEM FOR DETERMINING A WORKPIECE LOADING LOCATION IN A CNC MACHINE WITH A ROBOTIC ARM

(71) Applicant: Hurco Companies Inc., Indianapolis, IN (US)

(72) Inventors: Paul J. Gray, Zionsville, IN (US); Steven S. Gearhart, Indianapolis, IN (US); Jesse C. Satterwhite, Indianapolis, IN (US)

(73) Assignee: Hurco Companies Inc., Indianapolis, IN (US)

( * ) Notice: Subject to any disclaimer, the term of this patent is extended or adjusted under 35 U.S.C. 154(b) by 14 days.

(21) Appl. No.: 18/864,295

(22) PCT Filed: May 10, 2023

(86) PCT No.: PCT/US2023/021756
§ 371 (c)(1),
(2) Date: Nov. 8, 2024

(87) PCT Pub. No.: WO2023/220193
PCT Pub. Date: Nov. 16, 2023

(65) Prior Publication Data

US 2025/0303568 A1 Oct. 2, 2025

Related U.S. Application Data

(63) Continuation of application No. 17/740,627, filed on May 10, 2022, now Pat. No. 12,485,538.

(51) Int. Cl.
*B25J 9/16* (2006.01)
*B25J 11/00* (2006.01)
*B25J 13/08* (2006.01)

(52) U.S. Cl.
CPC ........... *B25J 9/1664* (2013.01); *B25J 9/1653* (2013.01); *B25J 11/0055* (2013.01); *B25J 13/082* (2013.01)

(58) Field of Classification Search
CPC ...... B23Q 7/04; B25Q 17/2291; B25J 9/1653; B25J 9/1664; B25J 9/1687; B25J 11/0055;

(Continued)

(56) References Cited

U.S. PATENT DOCUMENTS 6,308,113 B1 10/2001 Nowlin et al.
9,207,668 B2 12/2015 Zhang et al.

(Continued)

FOREIGN PATENT DOCUMENTS

JP 4188476 B2 11/2008
WO 2018/010373 A1 1/2018
WO 2022/080062 A1 4/2022

OTHER PUBLICATIONS

International Preliminary Report on Patentability received for PCT Patent Application No. PCT/US2023/021756, mailed on Nov. 21, 2024, 6 pages.

(Continued)

*Primary Examiner* — Dale Moyer
(74) *Attorney, Agent, or Firm* — Faegre Drinker Biddle & Reath LLP

(57) ABSTRACT

A system is provided for determining a loading location of a workpiece relative to a holding fixture, comprising: a robot including a sensor; and a controller coupled to the robot and configured to activate the robot to grip the workpiece; enable a free-drive mode to permit an operator to move the gripped workpiece to a starting location: execute a center location routine including causing the robot to: move in a first direction until the sensor senses contact with a first surface (Continued)

of the holding fixture; move in a second direction until the sensor senses contact with a second surface: move in a third direction until the sensor senses contact with a third surface; and compute a three-dimensional center point of the holding fixture representing the loading location of the workpiece using the first, second and third sensed positions of contact.

24 Claims, 18 Drawing Sheets

(58) Field of Classification Search
CPC .................. B25J 13/082; B25J 13/085; G05B 2219/40541
See application file for complete search history.

(56) References Cited

U.S. PATENT DOCUMENTS 9,616,570 B2 4/2017 Nihei et al.
11,938,633 B2 3/2024 Zhao et al.
12,485,538 B2 * 12/2025 Gray .................. B23Q 17/2291
2002/0031980 A1 3/2002 Matsumoto et al.
2006/0276934 A1 12/2006 Nihei et al.
2011/0022216 A1 1/2011 Andersson
2012/0152911 A1 6/2012 Diez et al.
2012/0330463 A1 * 12/2012 Schreiber ............... B25J 9/1687 700/260
2017/0021500 A1 * 1/2017 Davis ..................... B25J 9/1697
2019/0168378 A1 * 6/2019 Ishikawa .............. G01B 5/0007
2021/0260756 A1 * 8/2021 Yamamoto ............. B25J 13/085
2021/0387301 A1 * 12/2021 O'Hare .................. G01B 5/008
2023/0045651 A1 * 2/2023 Fang ...................... B25J 9/1692
2023/0161317 A1 5/2023 O'Hare et al.
2023/0173673 A1 6/2023 Zhao et al.
2023/0364790 A1 11/2023 Gray et al.
2025/0262768 A1 * 8/2025 Hamm ................... B25J 9/1692

OTHER PUBLICATIONS

International Search Report and Written Opinion received for PCT Patent Application No. PCT/US2023/021756, mailed on Aug. 15, 2023, 20 pages.

* cited by examiner 340
344
418
320
334
336

344
418

334
320
332
330
328
326

METHOD AND SYSTEM FOR DETERMINING A WORKPIECE LOADING LOCATION IN A CNC MACHINE WITH A ROBOTIC ARM

FIELD OF THE DISCLOSURE

The present disclosure relates to orienting a robotic arm, and more specifically to a method and system for orienting a workpiece held by a robotic arm relative to a holding fixture of a machine tool to permit automatic, repeatable placement of workpieces and removal of finished parts.

BACKGROUND

It is known to automatically "pick and place" workpieces from a workpiece tray to a holding fixture (such as a vice) in a machine tool (such as a CNC machine) using a robotic arm. This operation, robotic machine tending, requires accurately establishing the three-dimensional location and alignment of the robot coordinate system with the holding fixture in a CNC machine to successfully load parts. The relative locations and orientations of the robot base coordinate system, the end of arm coordinate system, the CNC machine coordinate system and the workpiece holding fixture location inside the CNC are all linked by three-dimensional coordinate system transformations.

Presently there are several ways robot arm location and alignment are handled in industry. The most common method is to carefully teach the robot by jogging it with a teach pendant to the holding fixture location. Alternatively, an operator either uses indicators or other measuring devices to find the holding fixture location or center and program the robot, or they may have the robot grasp the target workpiece and then jog the robot to teach the location for loading the workpiece into the holding fixture. In either scenario, the process is manual and requires that the operator set the location very carefully. The process is tedious in that for many parts, particularly for CNC Mills, this process will need to be repeated for every workpiece and holding fixture combination that will be automated. Also, since the robot system and CNC systems are generally independent devices, if the holding fixture is moved (located at a different location on the CNC table), the CNC axes positions for exchanging parts are changed, the robot system is moved, or the robot grippers' grip position on the part is changed, then the operator will need to repeat the process.

Additionally, when a robot includes a free-drive mode of operation wherein the operator can manually move the gripper of the robot and a vice or chuck of a CNC machine clamps onto the workpiece while the gripper is holding the workpiece, the registered loading location may be slightly affected. This is due in part to the compliance of the robot arm, particularly when the robot is extended significantly (i.e., its most flexible state) to load workpieces into the CNC machine. This compliance or elasticity may not be perfectly reflected by the joint encoders and the loading position stored may not be sufficiently accurate. In such instances, an additional step of manually jogging the robot to center the workpiece is performed. Furthermore, the workpiece may move relative to the fingers of the gripper due to forces of the vice or chuck clamping onto the workpiece causing additional positioning error. In free-drive mode, there is inevitably some residual force applied by the robot when the workpiece is clamped by vice or chuck. Also, there is a certain amount of resistance to small motions by the robot because the robot needs to detect and differentiate between the human intent to move the robot during free-drive and the control system resisting motion to keep the joints stationary when it determines that the robot should not be moving. The robot may sometimes even drift out of a stationary position when no force is applied to it. All of these factors result in error in recording the loading position and require tweaking the position by jogging the robot manually.

Vision systems have been developed to help simplify the process. One example from Robotiq uses locator plaques as 3D location and orientation markers. A camera mounted to the robot is used to detect the 3D location and orientation of the marker which then establishes the transformation sequence as follows: Camera transform→Image Processing→Location and Orientation of marker computed relative to camera→Camera mounted to end of robot arm transformed to robot base using joint positions This sequence of transformations is used to compute the transformation from the robot base to the marker. All robot positions are programmed relative to the marker. As long as the holding fixture location relative to the marker is not changed, if anything else is changed the robot motion will automatically compensate for the marker location and will load workpieces into the holding fixture without having to reteach the robot. However, if anything about the holding fixture location relative to the marker location and orientation changes, or if the workpiece geometry itself changes, the robot will need to be retaught.

There is also a mechanical variant of the above-mentioned camera system available from Flexxbotics. It follows a similar principle except that a special 3D fixture is mounted to a specific location on the robot wrist and a mating 3D marker part is mounted to another object (e.g., near the holding fixture) just as the camera system uses a locator plaque as a marker. When the robot is jogged to the 3D marker part and mated to it, the robot transformation is computed using the robot joint positions similar to how the camera transform is computed to find the relative transform between the marker part and the robot base. All robot positions in the robot program are then updated to be relative to the 3D marker part location and orientation.

Each of the conventional approaches for accurately establishing the three-dimensional location and alignment of the robot coordinate system with the holding fixture in a CNC machine is deficient as time consuming, tedious, costly, prone to error, or limited in providing flexibility for new set up configurations. The present disclosure eliminates (1) the need to establish an intermediate marker location and orientation and (2) the operation of accurately jogging or moving the robot to teach the position of the marker.

SUMMARY

According to one embodiment, the present disclosure provides a system for determining a loading location of a workpiece relative to a holding fixture, comprising: a robot configured to grip a workpiece and including a sensor; and a controller communicatively coupled to the robot, the controller having a memory including a plurality of instructions that when executed by the controller cause the controller to: activate the robot to grip the workpiece; enable a free-drive mode of operation of the robot to permit an operator to move the workpiece to a starting location adjacent to a center of the holding fixture; and respond to an input of the operator by executing a center location routine; wherein the center location routine includes: causing the robot to automatically move in a first direction until the sensor senses contact at a first position of contact between the workpiece and a first surface of the holding fixture; causing the robot to automatically move in a second direction until the sensor senses contact at a second position of contact between the workpiece and a second surface of the holding fixture; causing the robot to automatically move in a third direction until the sensor senses contact at a third position of contact between the workpiece and a third surface of the holding fixture: and computing a three-dimensional center point of the holding fixture representing the loading location of the workpiece using the first position of contact, the second position of contact and the third position of contact. In one aspect of this embodiment, the center location routine further includes causing the robot to automatically move in a fourth direction until the sensor senses contact at a fourth position of contact between the workpiece and a fourth surface of the holding fixture, and computing the three-dimensional center point of the holding fixture using the first position of contact, the second position of contact, the third position of contact and the fourth position of contact. In a variant of this aspect, the center location routine further includes causing the robot to automatically move in a fifth direction until the sensor senses contact at a fifth position of contact between the workpiece and a fifth surface of the holding fixture, and computing the three-dimensional center point of the holding fixture using the first position of contact, the second position of contact, the third position of contact, the fourth position of contact and the fifth position of contact. In another aspect, the sensor is a force sensor coupled to an end of arm of the robot. In a further aspect, the plurality of instructions when executed by the controller further cause the controller to cause the robot to move the workpiece to an in-machine position. In still another aspect, the plurality of instructions when executed by the controller further cause the controller to present an interface on a display of the controller which permits the operator to select axes of motion permitted for the robot when being moved while in free-drive mode. In a variant of this aspect, the interface further permits the operator to select which axes, if any, the robot is permitted to be rotated about when being moved in free-drive mode. In another aspect, the first surface is a first side surface of a first jaw of the holding fixture, the second surface is a second side surface of a second jaw of the holding fixture, and the third surface is a bottom surface of the holding fixture. In yet another aspect of this embodiment, the second direction is opposite the first direction and the third direction is perpendicular to the first direction and the second direction. Another aspect further comprises storing the computed loading location in a job file and retrieving and executing the job file to load additional workpieces in the holding fixture without repeating the enabling, causing and computing steps. In another aspect, the center location routine further includes causing the robot to automatically move to a center position between the first position of contact and the second position of contact. In still another aspect, the plurality of instructions when executed by the controller further cause the controller to execute the center location routine twice, thereby computing the loading location and a second loading location, and the center location routine further includes computing a final loading location by averaging the load location and the second loading location. In another aspect, the plurality of instructions when executed by the controller further cause the controller to execute a part removal routine after the workpiece has been formed into a finished part, the part removal routine causes the controller to: enable the free-drive mode of the robot to permit the operator to move the robot to a part pick-up location; respond to an input of the operator by commanding the robot to grip the finished part and commanding the holding fixture to unclamp the finished part; and move the robot to remove the finished part from the holding fixture. In a variant of this aspect, the part removal routine further causes the controller to move the robot to an in-machine position.

In another embodiment, the present disclosure provides a method of determining a loading location of a workpiece relative to a holding fixture, comprising: activating, by a controller, a robot to grip the workpiece; enabling, by the controller, a free-drive mode of operation of the robot to permit an operator to move the workpiece to a starting location adjacent to a center of the holding fixture; causing, by the controller, the robot to automatically move in a first direction until a sensor coupled to the robot senses contact at a first position of contact between the workpiece and a first surface of the holding fixture; causing, by the controller, the robot to automatically move in a second direction until the sensor senses contact at a second position of contact between the workpiece and a second surface of the holding fixture; causing, by the controller, the robot to automatically move in a third direction until the sensor senses contact at a third position of contact between the workpiece and a third surface of the holding fixture; and computing, by the controller, a three-dimensional center point of the holding fixture representing the loading location of the workpiece using the first position of contact, the second position of contact and the third position of contact. One aspect of this embodiment further comprises causing the robot to automatically move in a fourth direction until the sensor senses contact at a fourth position of contact between the workpiece and a fourth surface of the holding fixture, and computing the three-dimensional center point of the holding fixture includes using the first position of contact, the second position of contact, the third position of contact and the fourth position of contact. A variant of this aspect further comprises causing the robot to automatically move in a fifth direction until the sensor senses contact at a fifth position of contact between the workpiece and a fifth surface of the holding fixture, and computing the three-dimensional center point of the holding fixture includes using the first position of contact, the second position of contact, the third position of contact, the fourth position of contact and the fifth position of contact. In another aspect, the sensor is a force sensor coupled to an arm of the robot. Still another aspect further comprises presenting, by the controller, an interface on a display of the controller which permits the operator to select axes of motion permitted for the robot when being moved while in free-drive mode. In another aspect, the first surface is a first side surface of a first jaw of the holding fixture, the second surface is a second side surface of a second jaw of the holding fixture, and the third surface is a bottom surface of the holding fixture. In yet another aspect, the second direction is opposite the first direction and the third direction is perpendicular to the first direction and the second direction.

In yet another embodiment, the present disclosure provides a non-transitory, computer-readable medium storing instructions that, when executed by a controller, cause the controller to: activate a robot to grip a workpiece; enable a free-drive mode of operation of the robot to permit an operator to move the workpiece to a starting location adjacent to a center of a holding fixture; cause the robot to automatically move in a first direction until a sensor coupled to the robot senses contact at a first position of contact between the workpiece and a first surface of the holding fixture; cause the robot to automatically move in a second direction until the sensor senses contact at a second position of contact between the workpiece and a second surface of the holding fixture; cause the robot to automatically move in a third direction until the sensor senses contact at a third position of contact between the workpiece and a third surface of the holding fixture; and compute a three-dimensional center point of the holding fixture representing a loading location of the workpiece using the first position of contact, the second position of contact and the third position of contact. In one aspect of this embodiment, the instructions further cause the controller to cause the robot to automatically move in a fourth direction until the sensor senses contact at a fourth position of contact between the workpiece and a fourth surface of the holding fixture, and compute the three-dimensional center point of the holding fixture using the first position of contact, the second position of contact, the third position of contact and the fourth position of contact. In a variant of this aspect, the instructions further cause the controller to cause the robot to automatically move in a fifth direction until the sensor senses contact at a fifth position of contact between the workpiece and a fifth surface of the holding fixture, and compute the three-dimensional center point of the holding fixture using the first position of contact, the second position of contact, the third position of contact, the fourth position of contact and the fifth position of contact.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
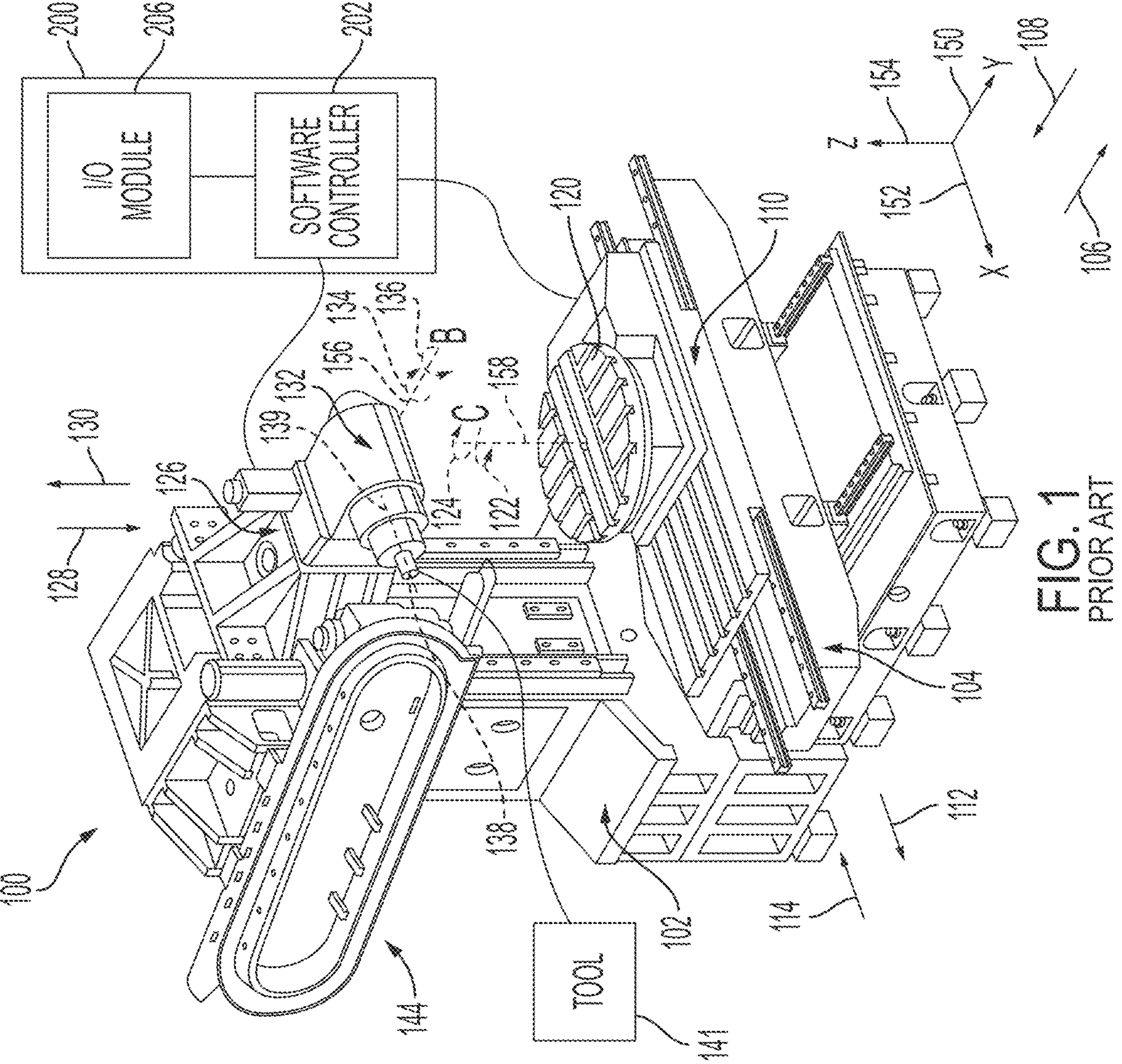
FIG. 1 is a schematic diagram of a machine tool system.

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

DETAILED DESCRIPTION OF EMBODIMENTS OF THE DISCLOSURE

In general, the method and system of the present disclosure uses a force sensor mounted to a robot or, alternatively, the joint torque sensors commonly found on collaborative robots to sense and compute the holding fixture location to reliably and automatically load workpieces into the holding fixture without requiring accurate jogging and positioning of the robot to manually teach the location for loading the workpiece.

Referring now to FIG. 1, a machine tool system 100 of a type that may be used with the present disclosure is shown having a motion control system 200. Hereinafter, all variations of machine tool system 100 discussed are commonly referred to as "CNC machine 100." In this example, CNC machine 100 includes a frame 102 having a first saddle 104 coupled thereto. Saddle 104 is translatable in directions 106 and 108. A second saddle 110 is supported by first saddle 104. Saddle 110 is translatable in directions 112 and 114 relative to saddle 104. A platform 120 is supported by saddle 110 and is rotatable relative to saddle 110 in directions 122 and 124. In one example, each of saddle 104, saddle 110, and platform 120 are moveable by motors (not shown) which are controlled by motion control system 200.

Further, a third saddle 126 is supported by frame 102. Saddle 126 is translatable in directions 128 and 130. Saddle 126 supports a rotatable member 132. Rotatable member 132 is rotatable in directions 134 and 136 relative to saddle 126. In one example, each of saddle 126 and rotatable member 132 are moveable by motors (not shown) which are controlled by motion control system 200.

A tool spindle 138 is supported by rotatable member 132. Various tools 141 may be coupled to tool spindle 138 to perform various operations with CNC machine 100 as is known in the art. Tool spindle 138 is rotatable about a tool spindle axis 139 to input a rotation to the tool 141. In one example, a plurality of tools 141 are stored in a tool carousal 144.

The movement of saddle 104 in direction 106 or direction 108 is illustrated as a movement along a y-axis 150. The movement of saddle 110 in direction 112 or direction 114 is illustrated as a movement along an x-axis 152. The movement of saddle 126 in direction 128 and direction 130 is illustrated as a movement along a z-axis 154. The rotation of rotatable member 132 in direction 134 or direction 136 is illustrated as a movement about a B-axis 156. The rotation of platform 120 in direction 122 or direction 124 is illustrated as a movement about a C-axis 158. CNC machine 100 is an exemplary 5-axis machine. In one example, one of B-axis 156 and C-axis 158 is replaced with an A-axis wherein platform 120 is tiltable about one of x-axis 152 and y-axis 150.

Through the movement of one or more of the 5-axes of CNC machine 100 a tool 141 may be positioned relative to a part or workpiece supported by platform 120 to be machined. The workpiece may be secured to platform 120 to maintain the position of the workpiece to platform 120 using a holding fixture, such as a vice, as described below.

Figure 2:
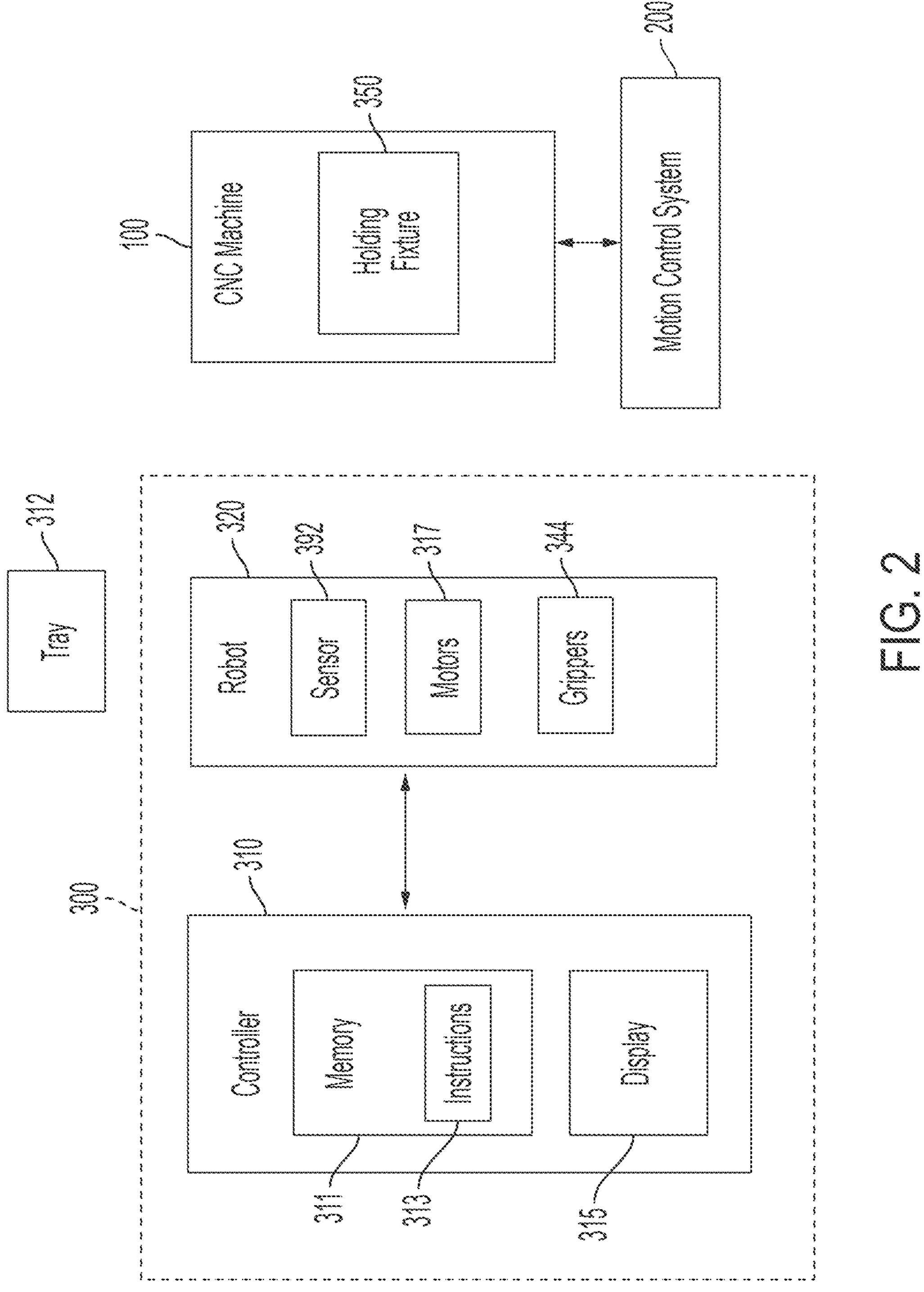
FIG. 2 is a high-level block diagram of components of a robot system for use in conjunction with a machine tool system.

FIG. 2 is a high-level block diagram of certain components of a robot system 300 configured according to the present disclosure to load and unload workpieces to and from a CNC machine 100. Robot system 300 generally includes a controller 310 and a robot 320. Controller 310 includes a variety of different components such as processors and drivers that are not shown for simplicity. Controller 310 generally functions as a computer and includes a memory 311 which stores a plurality of computer instructions 313 which are executed by controller 310. Controller 310 also includes a teach pendant having a display 315 which may function as a user interface. As is further described below, robot 320 includes several components which function as an automated arm for gripping objects, such as workpieces on a tray 312 and relocating them. Robot 320 is controlled by controller 310 to move the plurality of moveable components of robot 320 using a plurality of motors 317 and associated hardware/software. At least one sensor 392 of robot 320 is configured to detect contact of robot 320 with other objects such as holding fixture 350 of CNC machine 100 as is further described below.

Figure 3:
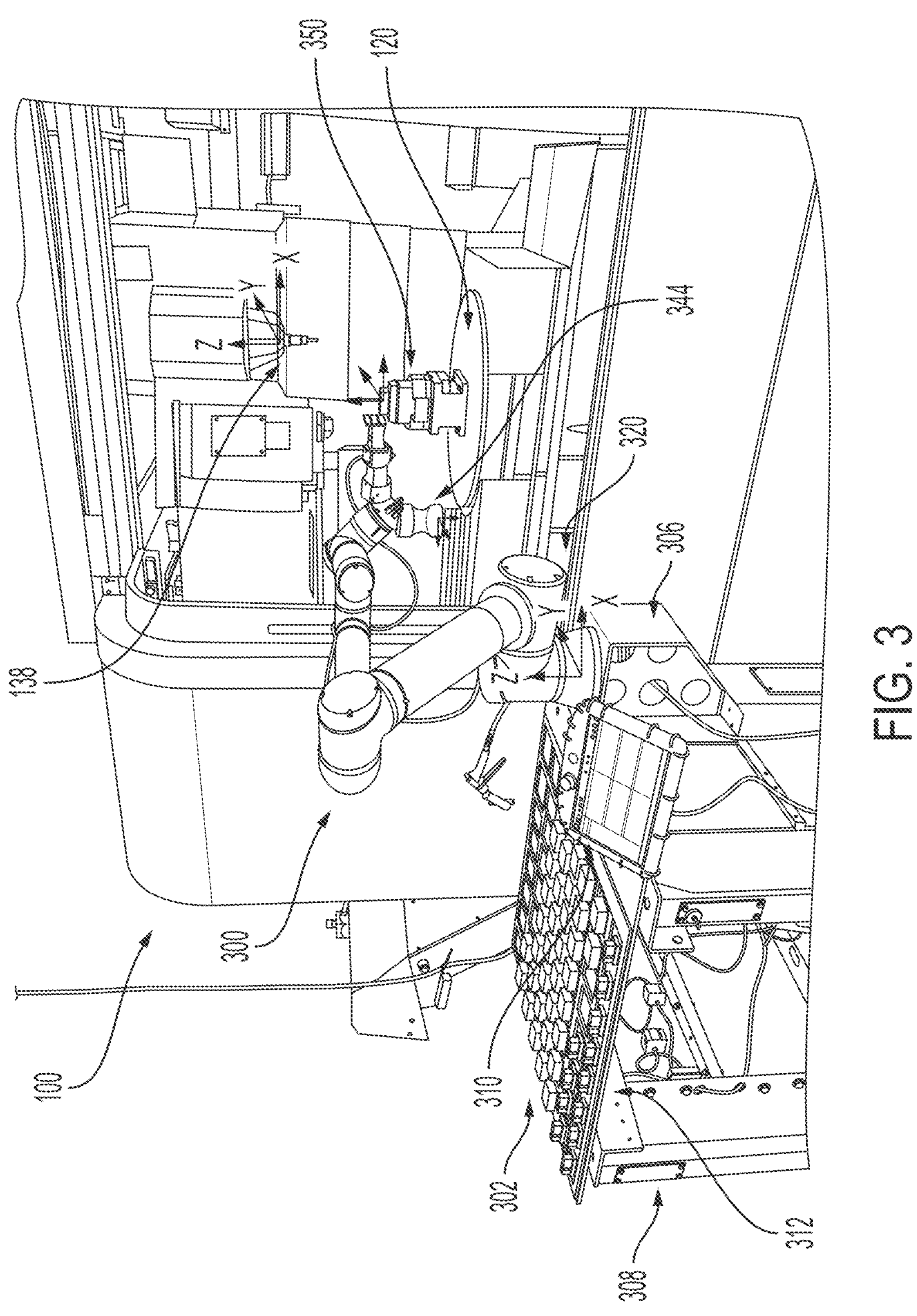
FIG. 3 is a perspective view of a machine tool system, workpiece station and robot system according to one embodiment of the present disclosure.

Referring now to FIG. 3, a simplified version of CNC machine 100 is shown as well as robot system 300 and a workpiece station 302 including tray 312. As shown, a holding fixture 350 is mounted to platform 120 of CNC machine 100. In this example, robot system 300 is mounted to a bracket 306, which in turn is mounted to a base 308 of workpiece station 302. Controller 310 is also mounted to bracket 306.

Figure 4:
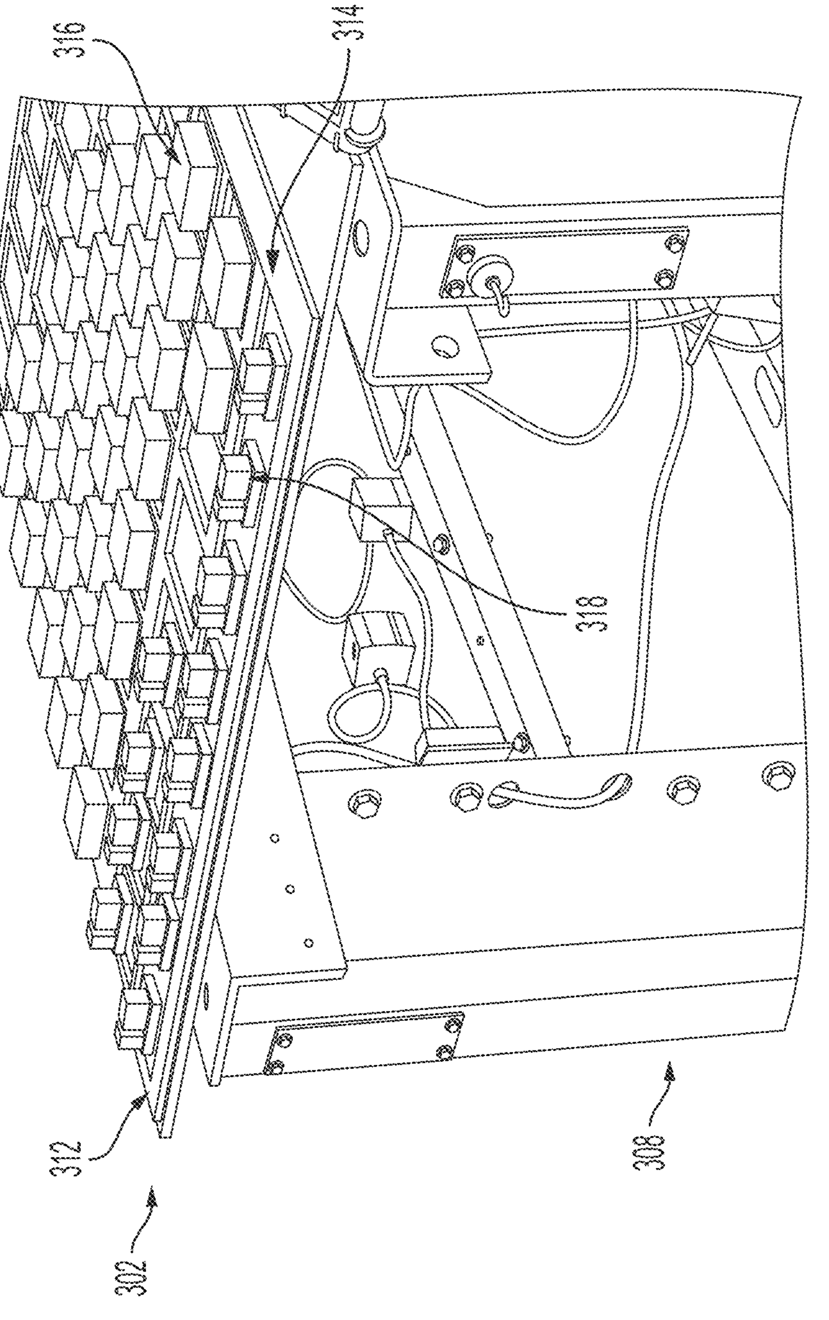
FIG. 4 is a perspective view of the workpiece station of FIG. 3.

As shown more clearly in FIG. 4, workpiece station 302 includes a tray 312 mounted to the upper portion of base 308. Tray 312 includes a plurality of workpiece recesses 314 which are precisely spaced on tray 312. A plurality of raw workpieces 316 are loaded into recesses 314, in this example, such that a corner of each workpiece 316 is registered in contact with a corner of the corresponding recess 314. In this manner, the locations of the workpieces 316 can be programmed into the robot system 300 during set up by determining the position of a single workpiece 316 in a single recess 314. As is also shown, finished parts 318 formed from workpieces 316 by CNC machine 100 are placed by robot system 300 back into a corresponding recess 314 when machining is complete.

Figure 5:
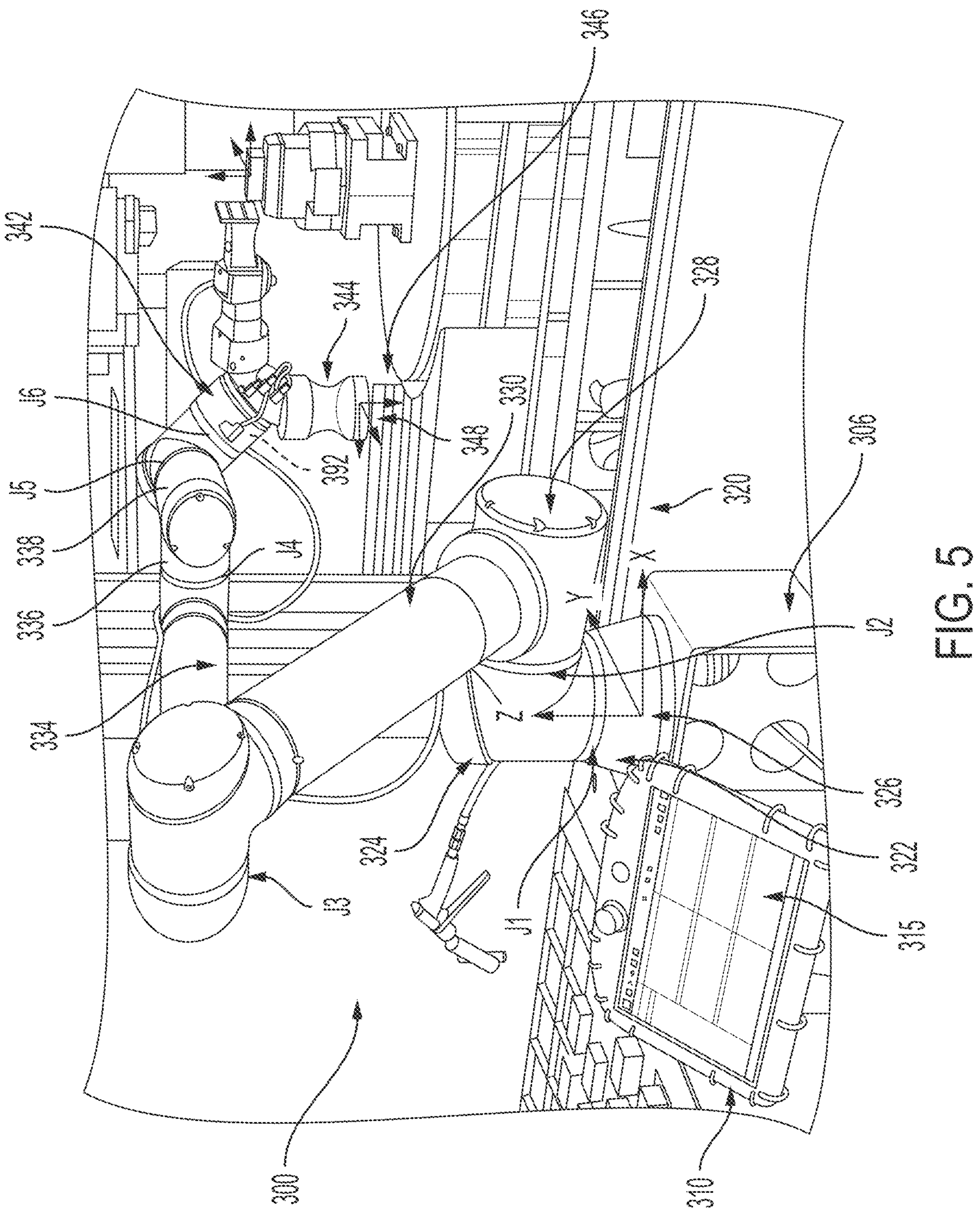
FIG. 5 is a perspective view of the robot system of FIG. 3.

Referring now to FIG. 5, an enlarged view of robot system 300 is shown. As indicated above, robot system 300 generally includes controller 310 and robot 320. Robot 320 includes a base 322 mounted to bracket 306, a riser 324 mounted to base 322 which permits swiveling of robot 320 about a z-axis of the robot coordinate system 326 at joint J1, an extension 328 coupled to riser 324 for rotation at joint J2, a first arm segment 330 coupled to extension 328, a second arm segment 334 coupled to first arm segment 330 at joint J3, a third arm segment 336 coupled to second arm segment 334 at joint J4, a fourth arm segment 338 coupled to third arm segment 336 at joint J5, an end of arm 342 coupled to fourth arm segment 340 at joint J6, and a pair of grippers 344 coupled to end of arm 342. Each gripper 344 includes a pair of opposed fingers 346 configured to grip a workpiece 316. As shown, an end of arm coordinate system 348 is associated with the position and orientation of each gripper 344. It should be understood that the principles of the present disclosure may be applied to a wide variety of robot configurations. Robot 320 is simply depicted as one example.

Figure 6:
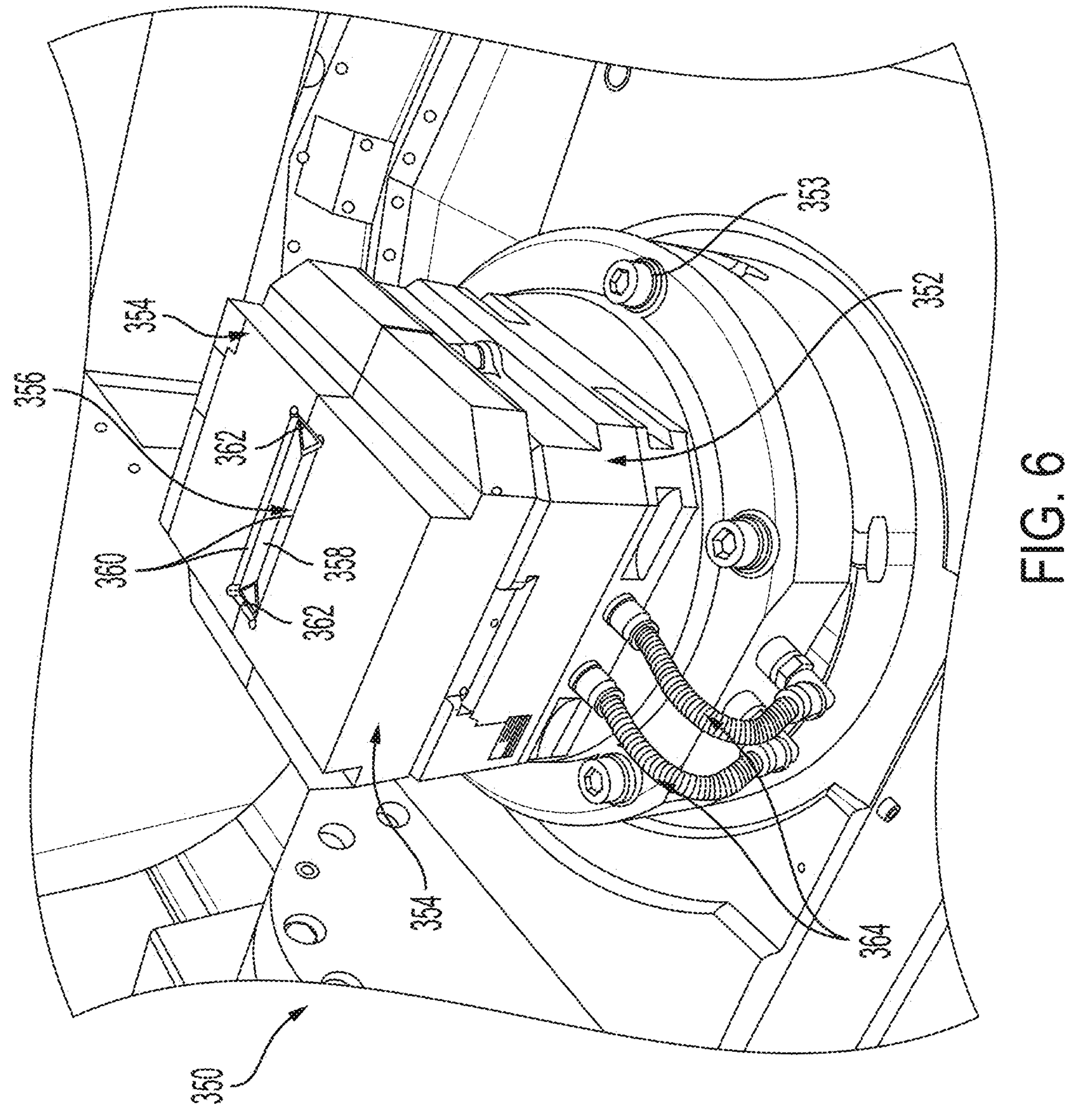
FIG. 6 is a perspective view of a workpiece holding fixture.

FIG. 6 depicts one example of a holding fixture 350 that may be used with the teachings of the present disclosure. In this example, holding fixture 350 is a pneumatic vice having a base 352 and a pair of opposed jaws 354 that when closed (as shown) create an opening 356 (in this example, a pocket). Base 352 is mounted to CNC machine 100 using a plurality of bolts 353 that are threaded into corresponding openings (not shown) formed on the mounting structure. Opening 356 includes a bottom surface 358, two side surfaces 360 (one on each jaw 354) and two end surfaces 362. Approximately one half of each end surface 362 is formed on one of the jaws 354 and the other half is formed on the other jaw. Jaws 354 are actuated via pneumatic tubing 364 under controller 310 in certain embodiments. In other embodiments, jaws 354 are controlled by motion control system 200 or an external PLC.

It should be understood that a wide variety of different holding fixtures 350 may be used in different machining set ups consistent with the teachings of the present disclosure. As is described below, for example, the jaws of a chuck may be used to hold workpieces on a lathe. Moreover, other types of vices may be used such as the vice depicted in FIGS. 9 and 10, which provides an opening between the side surfaces of the jaws and a single end surface.

As described below, the methods and systems of the present disclosure use at least one force sensor 392 mounted to robot 320 (or alternatively the joint torque sensors commonly found on collaborative robots) to sense and compute the holding fixture 350 location to reliably and automatically load workpieces 316 into holding fixture 350 without requiring accurate jogging and positioning of robot 320 to manually teach the location for loading workpiece 316. It should be understood that the term "force sensor 392" is used herein to refer to any device that provides feedback to controller 310 indicating that robot 320 has made contact with another surface, including but not limited to one or more force sensors, one or more joint torque sensors, one or more motor monitors that indicate the torque output of the motor, or other devices.

After robot 320 is located adjacent CNC machine 100, robot 320 is taught in a manner known to those skilled in the art the location of workpieces 316 in tray 312 and a route or motion path from the workpieces 316 to an "in-machine" position in the interior of CNC machine 100. After this set up, robot 320 is activated to pick up a workpiece 316 to be loaded in holding fixture 350. Robot 320 then moves workpiece 316 to the pre-taught, in-machine position. This position does not need to be accurate. Instead, the initial position only needs to be free from colliding with any objects like the machine tool enclosure and/or spindle 138.

Figure 7:
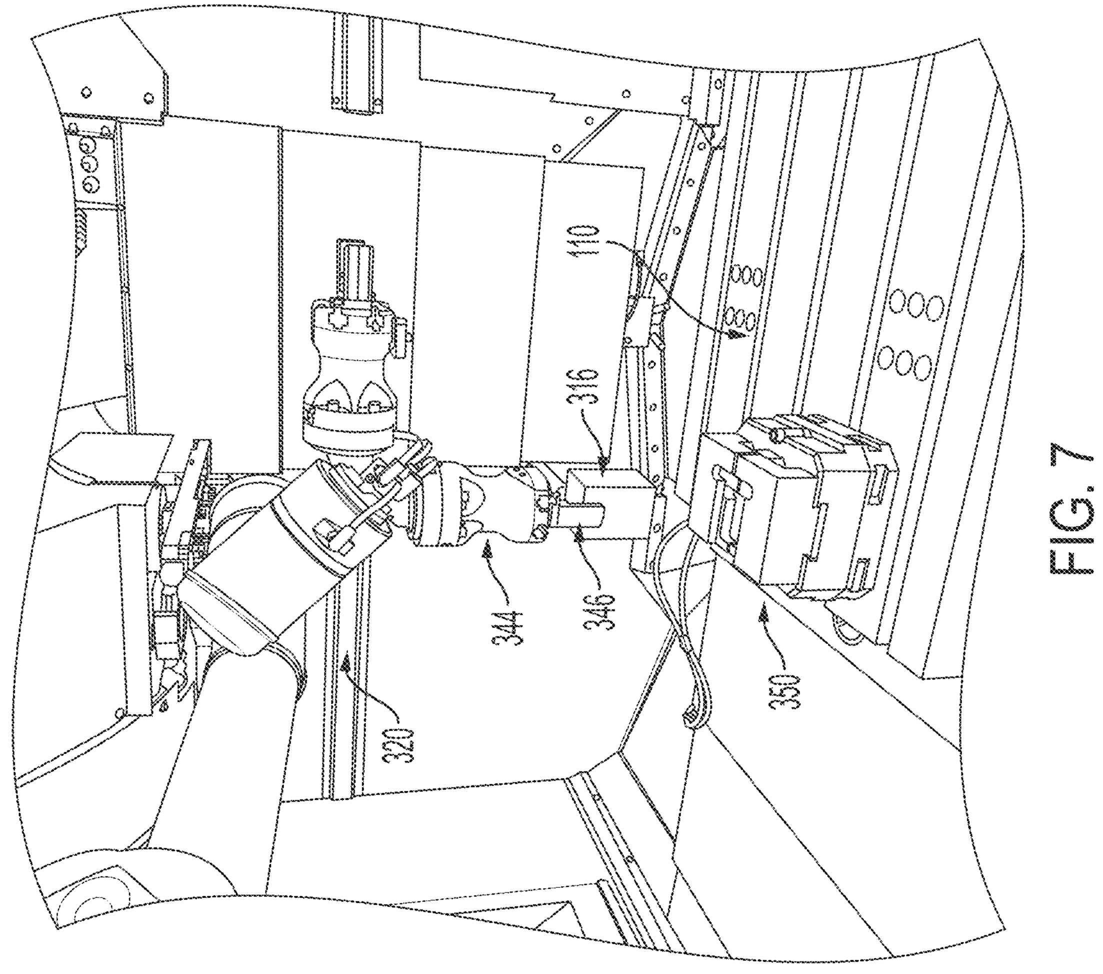
FIG. 7 is a perspective view of a robot holding a workpiece in an in-machine position.

FIG. 7 shows gripper 344 of robot 320 holding a raw workpiece 316 between fingers 346 of gripper 344 above and in proximity to holding fixture 350, which is mounted to a table or saddle 110 of CNC machine 100. In other words, FIG. 7 shows robot 320 holding workpiece 316 in the pre-taught, in-machine position.

Next, controller 310 executes instructions 313 in memory 311 to enable a free-drive mode of robot 320 and instructs the operator to move gripper 344 of robot 320 (and therefore workpiece 316) to near the center of holding fixture 350 (hereinafter referred to as "the starting location"). This manual operation does not require precision as the starting location is not the final pose of robot 320 to load workpiece 316. To assist the performance of this manual operation, controller 310 presents the operator with a choice to restrict some directional and rotational motion of robot 320 in free-drive mode as is further described below.

Figure 8:
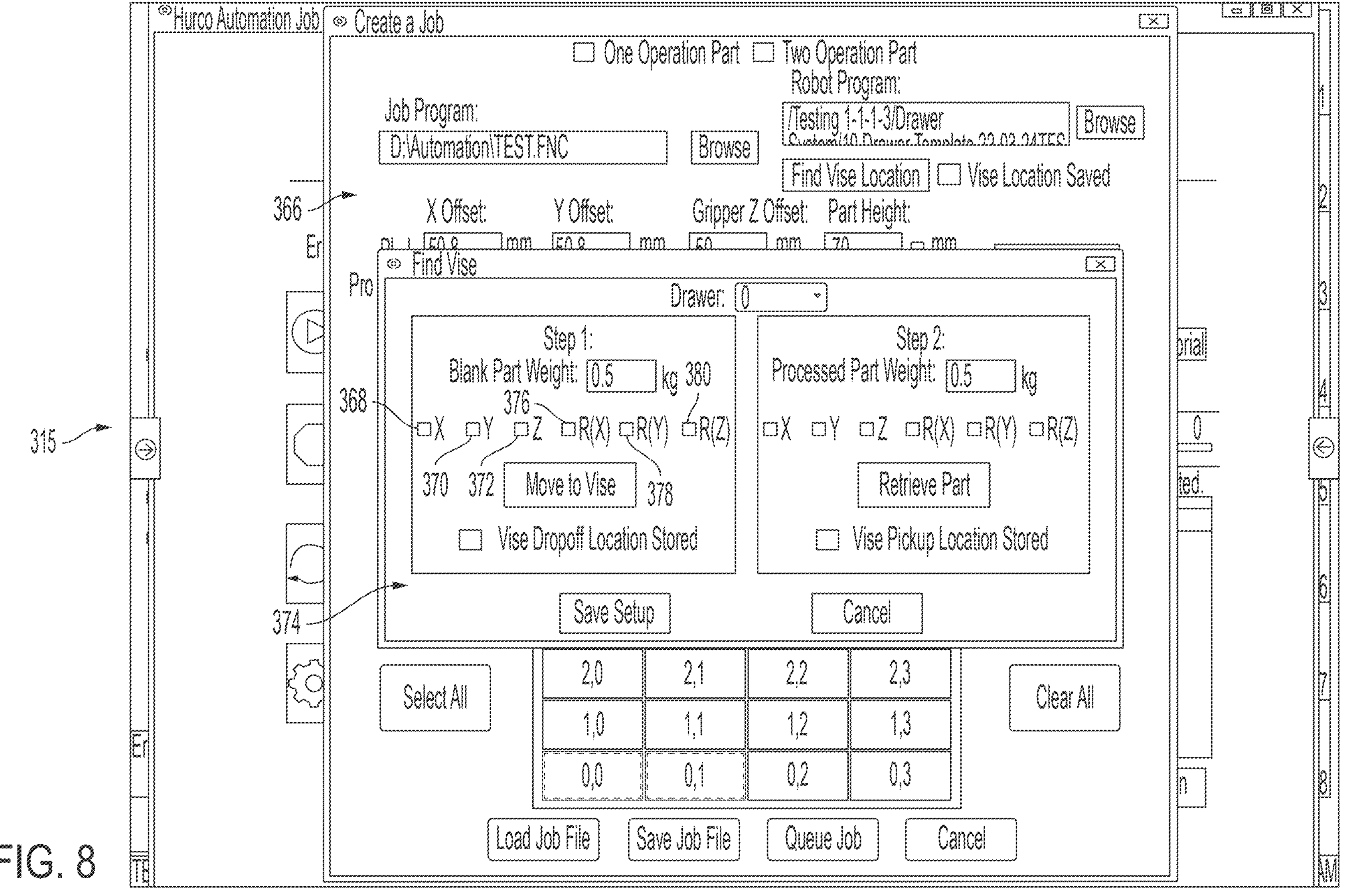
FIG. 8 is a screenshot of an interface of the robot system of FIG. 3.

For example, FIG. 8 depicts an interface 366 presented on display 315 to the operator by controller 310 wherein the operator may select to permit manual free-drive movement of robot 320 in each of the x-axis, the y-axis and the z-axis of either the robot base or gripper coordinate system by clicking the boxes 368, 370 and 372, respectively, in the move to vice window 374. As shown, the operator has not enabled the ability to move robot 320 manually about these axes (i.e., the boxes 376, 378 and 380 are not selected). As such, controller 310 will restrict movement of robot 320 about the x, y and z-axes when robot 320 is in free-drive mode (i.e., the orientation of gripper 344 and therefore workpiece 316 cannot manually be changed). In this manner, workpiece 316 is held in gripper 344 such that it remains in plane with holding fixture 350 and the XY plane of the CNC machine 100 to make it easy to position gripper 344 (and workpiece 316) near the center of holding fixture 350.

Figure 9:
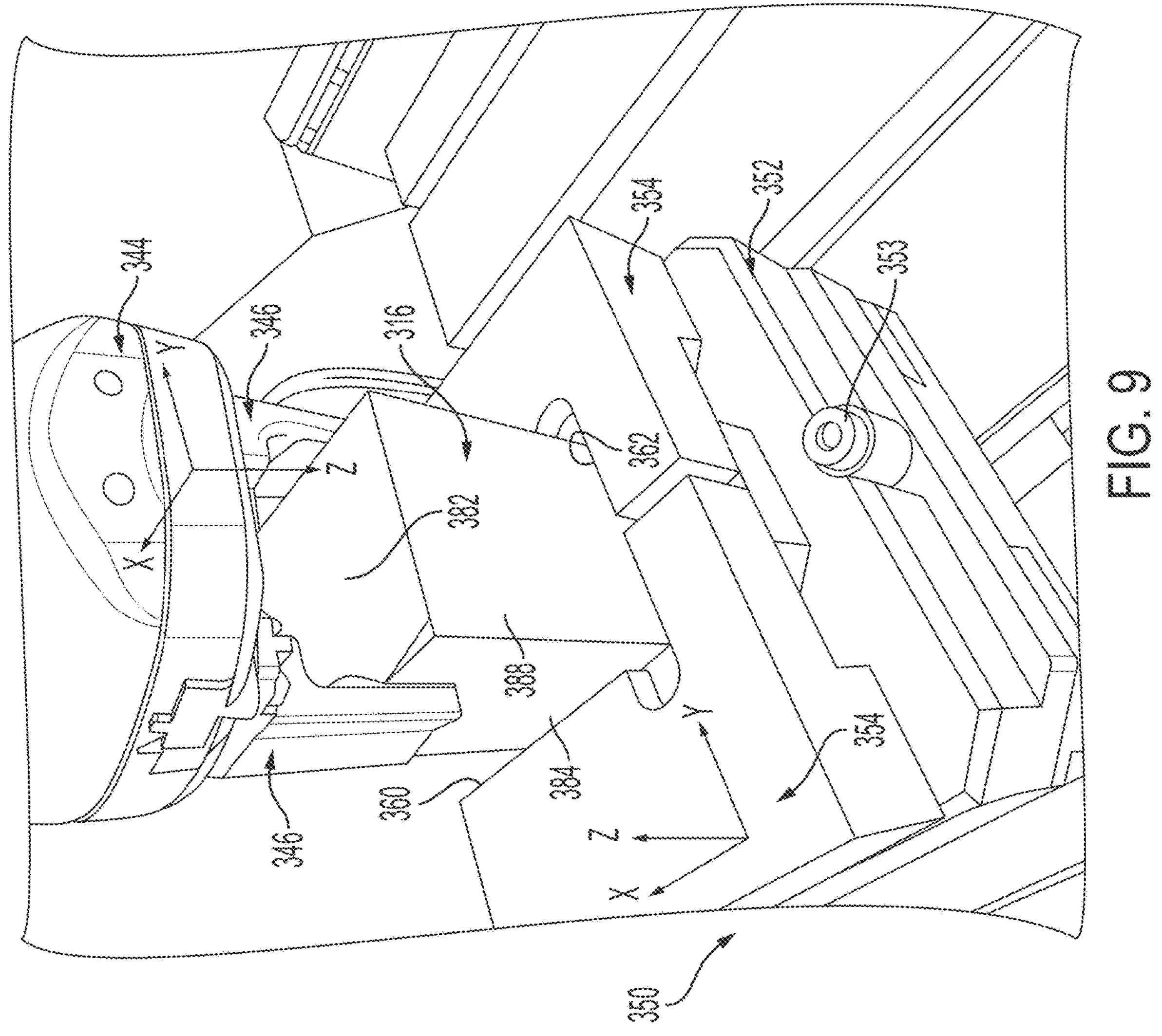
FIGS. 9 and 10 are perspective views of a robot holding a workpiece in a starting location near the center of a holding fixture.
Figure 10:
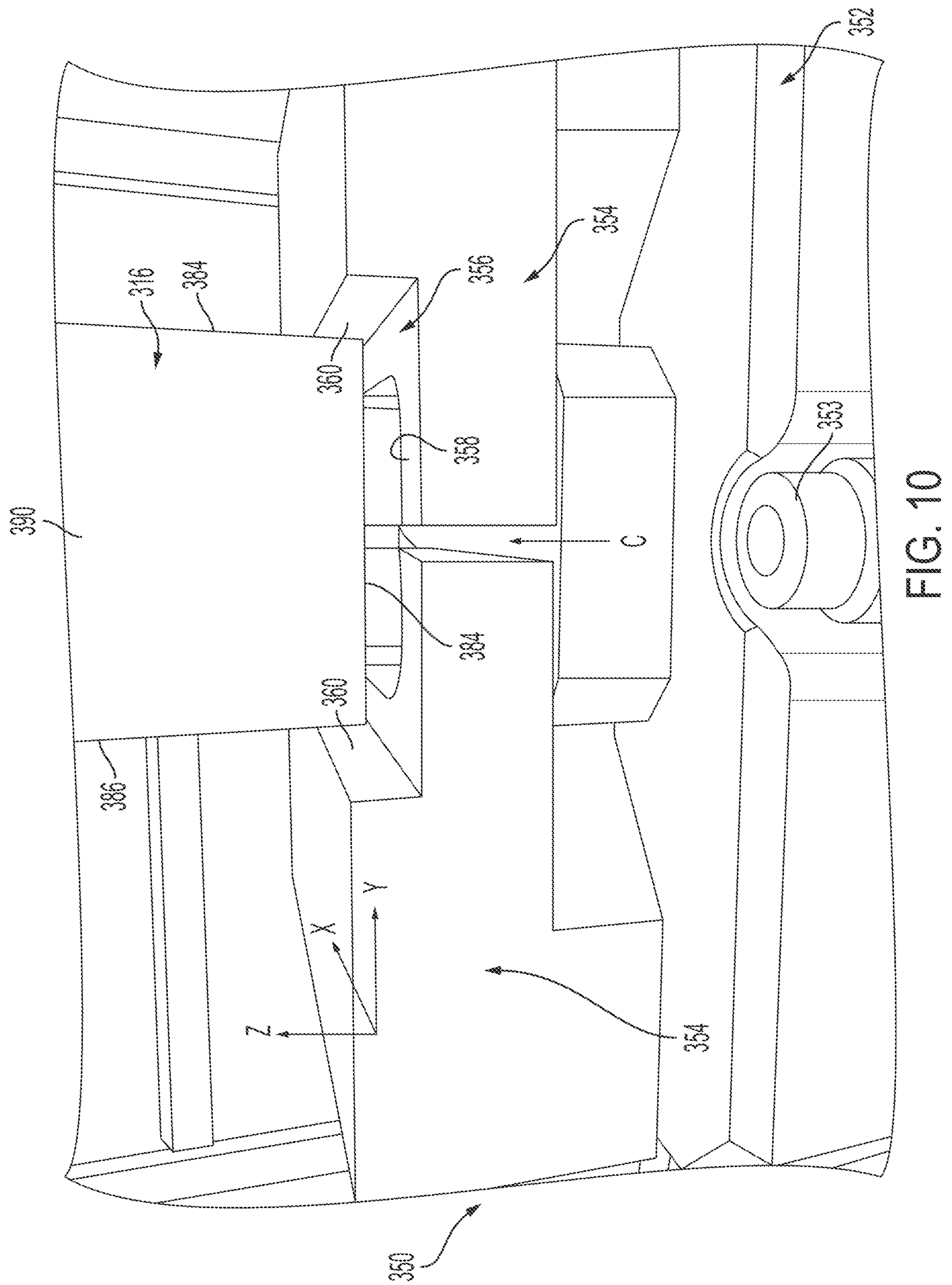

FIGS. 9 and 10 show gripper 344 holding workpiece 316 between fingers 346 after having been manually moved by the operator to the starting location near the center of holding fixture 350. More specifically, workpiece 316 is positioned partly into the opening 356 defined between side surfaces 360 of jaws 354, slightly above bottom surface 358 of opening 356 and spaced apart from each side surface 360 and from end surface 362. In this example, workpiece 316 is a cuboid, including an upper surface 382, a lower surface 384 which is parallel with upper surface 382, a first side surface 384, a second side surface 386 which is parallel with first side surface 384, a first end surface 388, and a second end surface 390 which is parallel with first end surface 388.

Once the operator has completed the task of manually positioning workpiece 316 into the starting location near the center of holding fixture 350, the operator activates a center location routine on controller 310 which proceeds to detect the precise location of holding fixture 350. Still referring to FIGS. 9 and 10, in one embodiment the program causes robot 320 to move in a y-direction of the gripper coordinate system depicted in FIG. 9 relative to base 322 of robot 320 until it detects contact between first side surface 384 of workpiece 316 and side surface 360 of one jaw 354. The contact is detected by force sensor 392 (FIG. 5), in this case mounted within end of arm 342 of robot 320. It should be understood, however, that the initial movement of robot 320 may be in any direction as long as the movement is toward a clamping surface of holding fixture 350. Next, the program causes robot 320 to move in an opposite y-direction until force sensor 392 detects contact between second side surface 386 of workpiece 316 and side surface 360 of the other jaw 354 of holding fixture 350. Controller 310 computes the center (denoted C in FIG. 10) from the detected locations of side surfaces 360 of jaws 354. Next, controller 310 causes robot 320 to move in the x-direction until force sensor 392 detects contact between end surface 388 of workpiece 316 and end surface 362 of jaws 354. Once contact is sensed, controller 310 causes robot 320 to move slightly in the opposite x-direction, then downwardly in the z-direction until force sensor 392 detects contact between lower surface 384 of workpiece 316 and bottom surface 358 of opening 356. Controller 310 next causes robot 320 to move slightly upwardly in the z-direction. From the detected locations of side surfaces 360 of jaws 354, bottom surface 358 of opening 356 and end surface 362 of jaws 354, controller 310 computes the three-dimensional center point of holding fixture 350 (i.e., the loading location), and the process is repeated to average the result for improved accuracy. The center point location is stored by controller 310 as the loading location for the workpiece 316/holding fixture 350 combination.

When computation of the loading location is complete, robot 320 loads workpiece 316, holding fixture 350 clamps onto workpiece 316 and robot 320 exits CNC machine 100. The operator then activates CNC machine 100 to machine workpiece 316 to form a first finished part 318.

Figure 11:
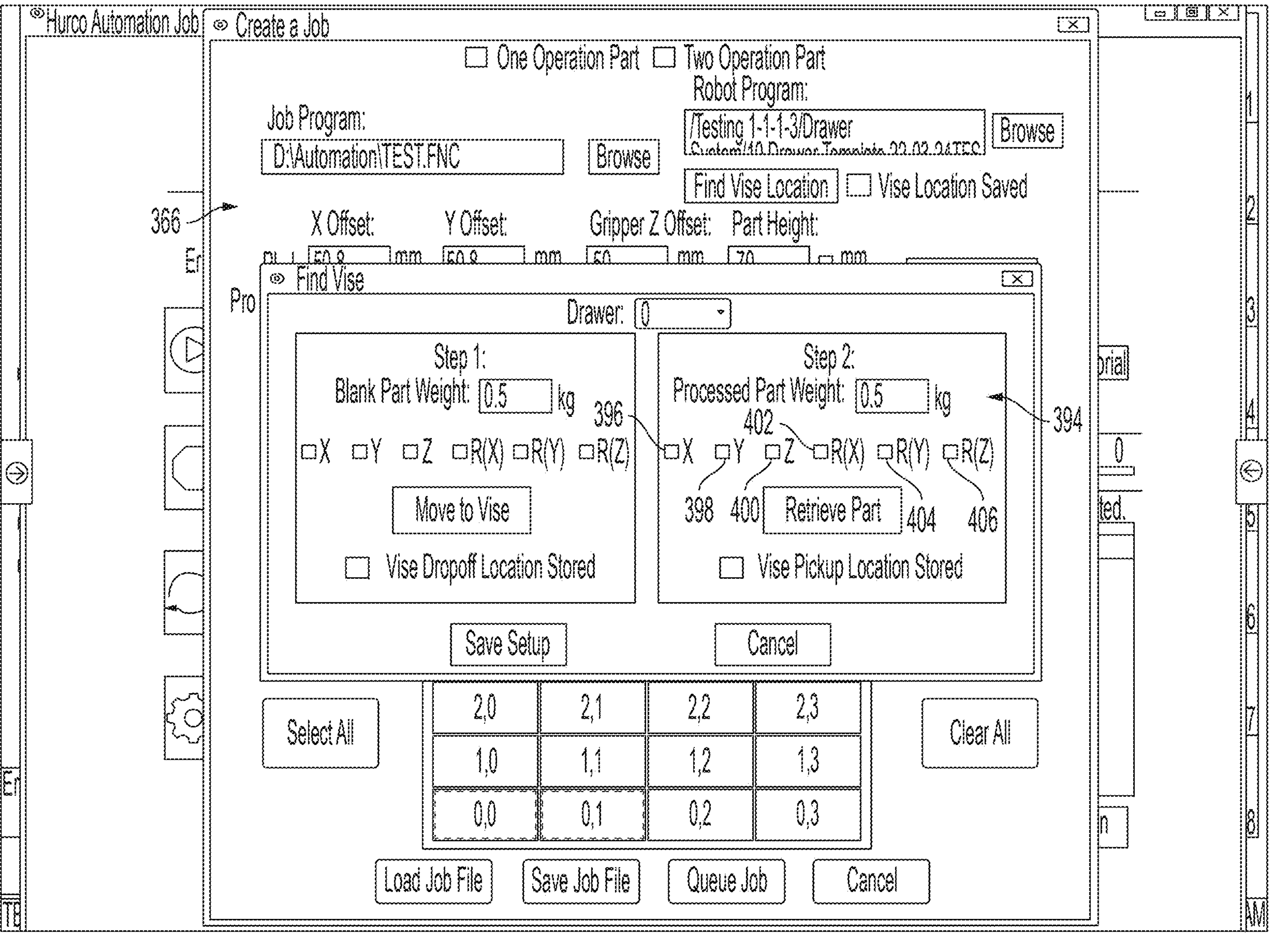
FIG. 11 is a screenshot of an interface of the robot system of FIG. 3.

Next, the operator initiates a part removal routine on controller 310. Specifically, the operator activates controller 310 to cause robot 320 to enter CNC machine 100 and assume the in-machine position described above. Controller 310 then places robot 320 in free-drive mode to allow the operator to move gripper 344 to the part pick-up location. Controller 310 then presents interface 366 on display 315 to the operator with a retrieve part window 394 activated as shown in FIG. 11. As was described above with reference to FIG. 8, the operator may select to permit manual free-drive movement of robot 320 in each of the x-axis, the y-axis and the z-axis by clicking the boxes 396, 398 and 400, respectively. As shown, the operator has not enabled the ability to move robot 320 manually about these axes (i.e., the boxes 402, 404 and 406 are not selected). As such, controller 310 will restrict movement of robot 320 about the x, y and z-axes when robot 320 is in free-drive mode (i.e., the orientation of gripper 344 cannot manually be changed). In this manner, gripper 344 remains in plane with holding fixture 350 and the XY plane of the CNC machine 100 to make it easy to position robot 320 onto finished part 318.

The operator then causes controller 310 to command robot 320 to grip finished part 318 between fingers 346, which causes robot 320 to automatically center itself on finished part 318 as it remains in free-drive mode. The operator then commands holding fixture 350 to unclamp finished part 318. Then, controller 310 commands robot 320 to remove finished part 318 from holding fixture 350 and place finished part 318 into recess 314 (FIG. 4) from which the workpiece was removed when in its raw condition. At this point, robot 320 is completely programmed to load workpieces 316 into and unload parts 318 out of holding fixture 350.

Figure 12:
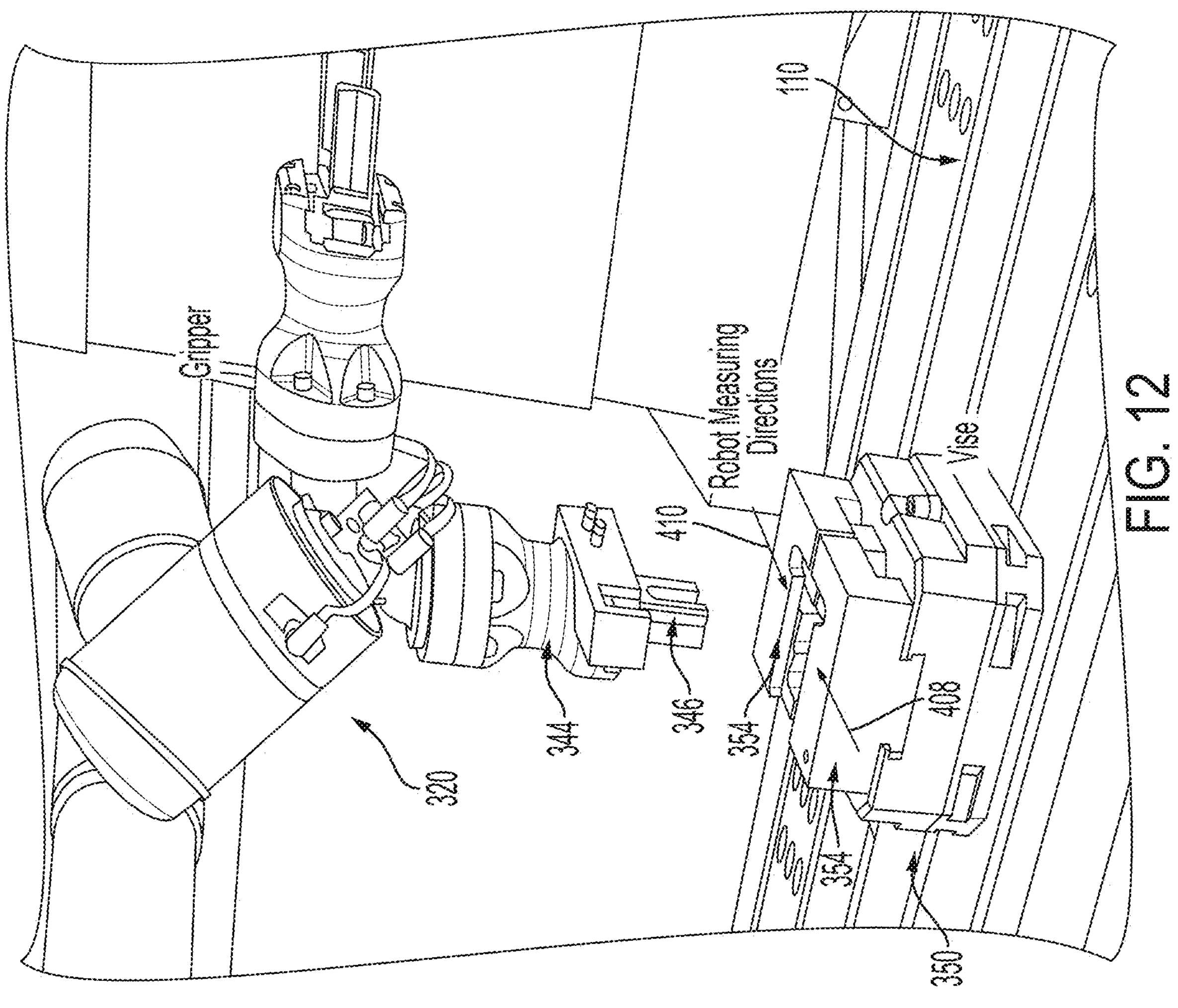
FIG. 12 is a perspective view of a robot in an in-machine position.

The software of controller 310 also permits the operator to specify which directions should be measured in the process of determining the loading location. In some cases (as depicted in FIG. 12), only the center between the open jaws 354 of holding fixture 350 (a vise) may need to be measured for the center location (i.e., contact only need be sensed in directions 408, 410) and the opposite direction center is not needed. In such cases, robot 320 may load workpiece 316 and use force sensor 392 to find a positive stop surface to push against while holding fixture 350 clamps onto workpiece 316.

Figure 13:
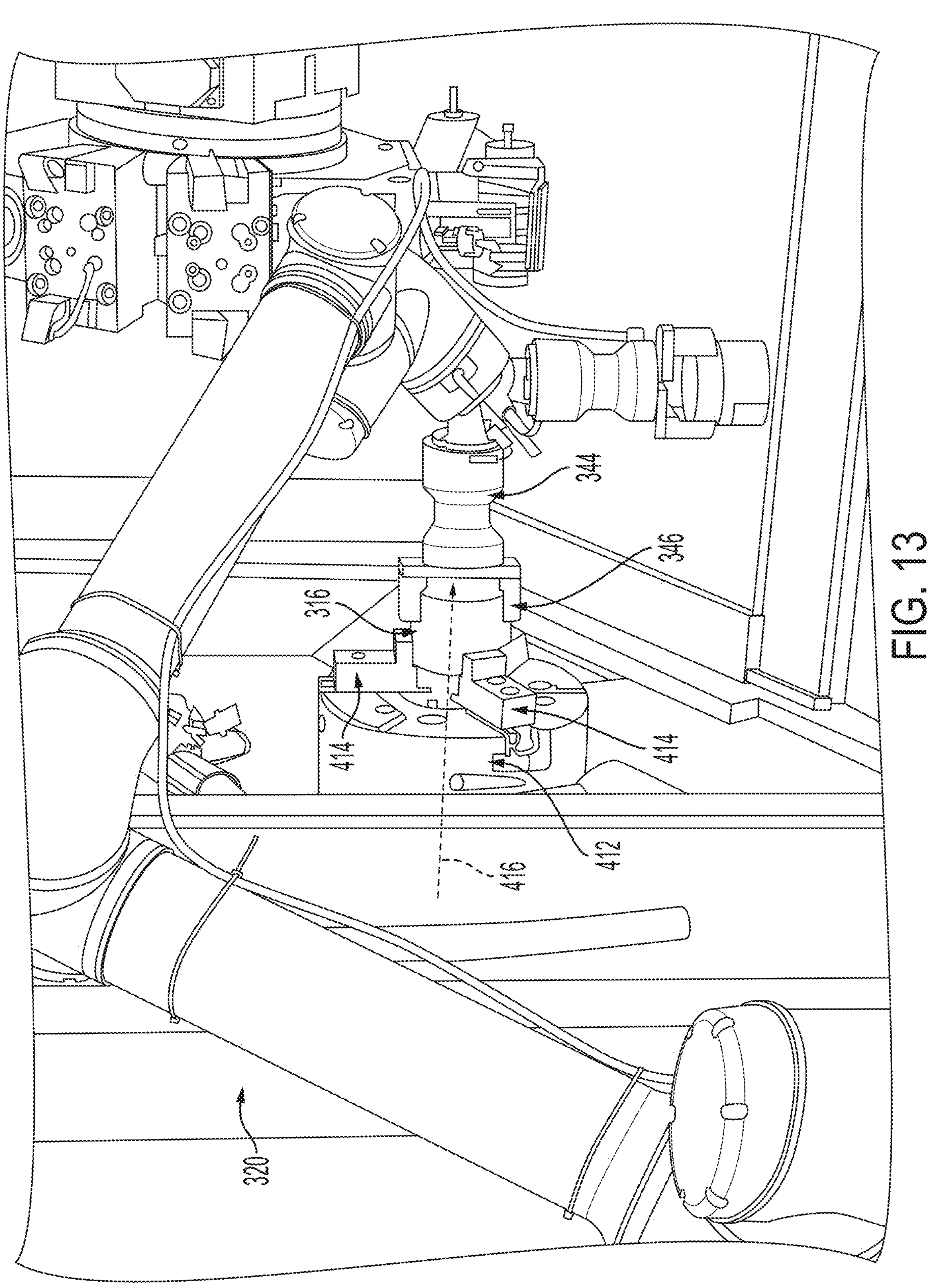
FIG. 13 is a perspective view of a robot holding a workpiece near a chuck of a machine tool system.

In other applications of the present disclosure, robot 320 may need to find the center of a 3-jaw chuck as depicted in FIG. 13. As shown, chuck 412 includes three jaws 414 (only two shown) arranged radially about a central axis 416 of chuck 412 and spaced apart from one another by 120 degrees. The process for finding the center point of chuck 412 is substantially the same as the process described above, except the gripper 344 moves in a plane perpendicular to central axis 416 and in three directions (toward each of jaws 414) to sense contact. To accomplish this movement, chuck 412 must be rotated and oriented at a specific angle, which must be programmed into controller 310.

Figures 14A, 14B:
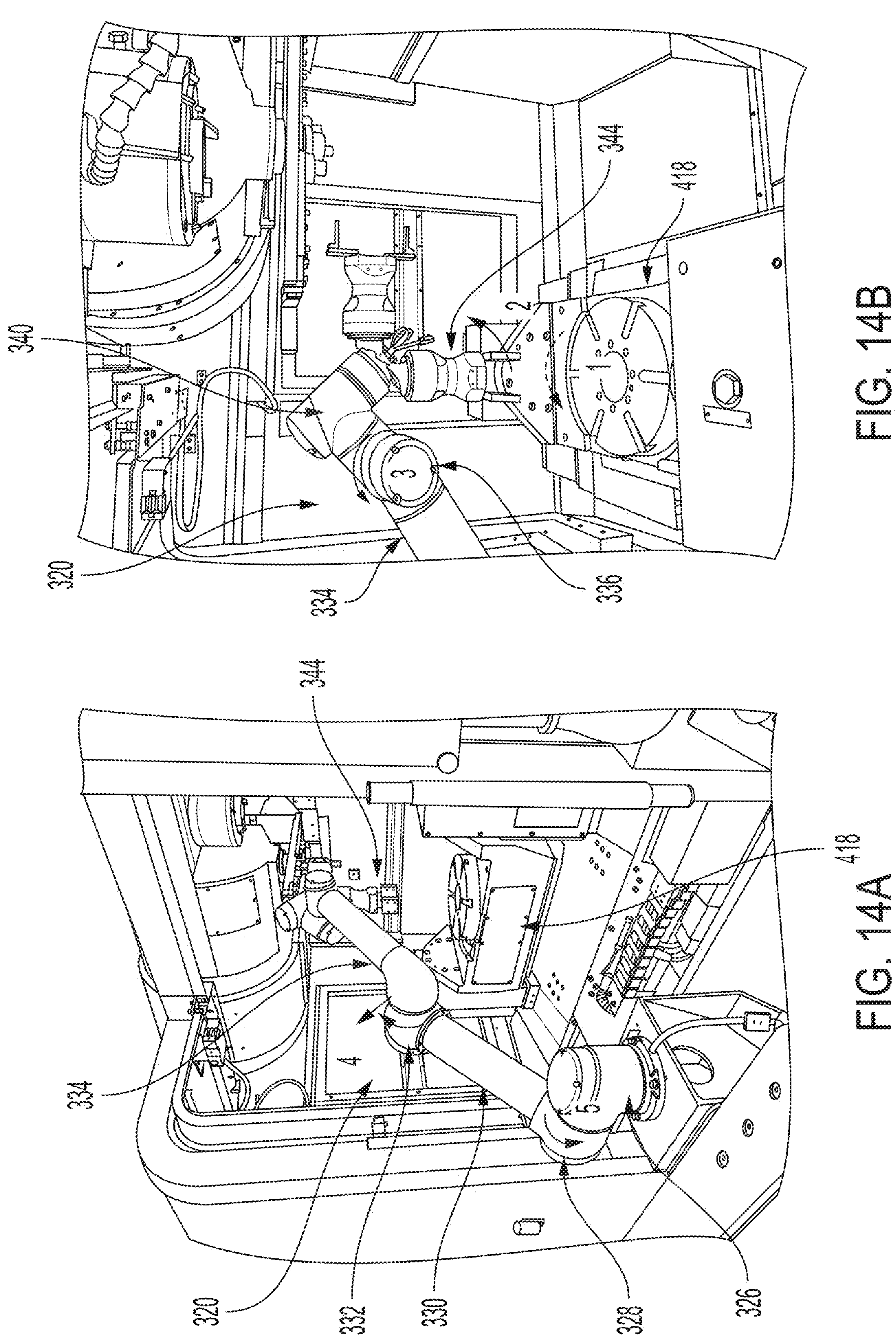
FIGS. 14A and 14B are perspective views depicting adjustment of a robot orientation to align with a mounting surface of a holding fixture.

For 5-Axis machine tools 100, robot 320 may need to load workpieces 316 into holding fixtures 350 that are not aligned with the XY plane of coordinate system 326 of base 322 of robot 320 and the XY plane of the coordinate system of machine tool 100. This may be due to clearance issues inside machine tool 100, or limitations of reach of the arm of robot 320. For example, in FIGS. 14A and 14B the gripper 344 of robot 320 must extend farther from base 326 to align with the orientation of trunnion 418 on which holding fixture (not shown) is mounted. As shown, when trunnion 418 is rotated about the A-axis (arrow 1), gripper 344 must be rotated to remain perpendicular with the surface of trunnion 418 (arrow 2). To accomplish this, fourth arm segment 340 must be rotated about second joint 336 (arrow 3), which also requires rotation of second arm segment 334 about first joint 332 (arrow 4) and rotation of first arm segment 330 about extension 328 (arrow 5). These joint motions result in gripper 344 being positioned farther away from base 326, thereby extending the reach of robot 320. As discussed above with reference to FIGS. 8 and 11, software of controller 310 permits the operator to select the directions in which robot 320 can be manually moved during free-drive mode, and can restrict robot motion accordingly using native functions commonly found in robot controllers such as controller 310. For an oriented workpiece 316 (e.g., a workpiece 316 that needs to be moved out of the XY plane to align with a holding fixture 350), additional rotation directions can be allowed (i.e., by clicking boxes 376, 378, 380 of FIG. 8) to permit the operator to orient workpiece 316 to match the orientation of holding fixture 350.

Figure 15:
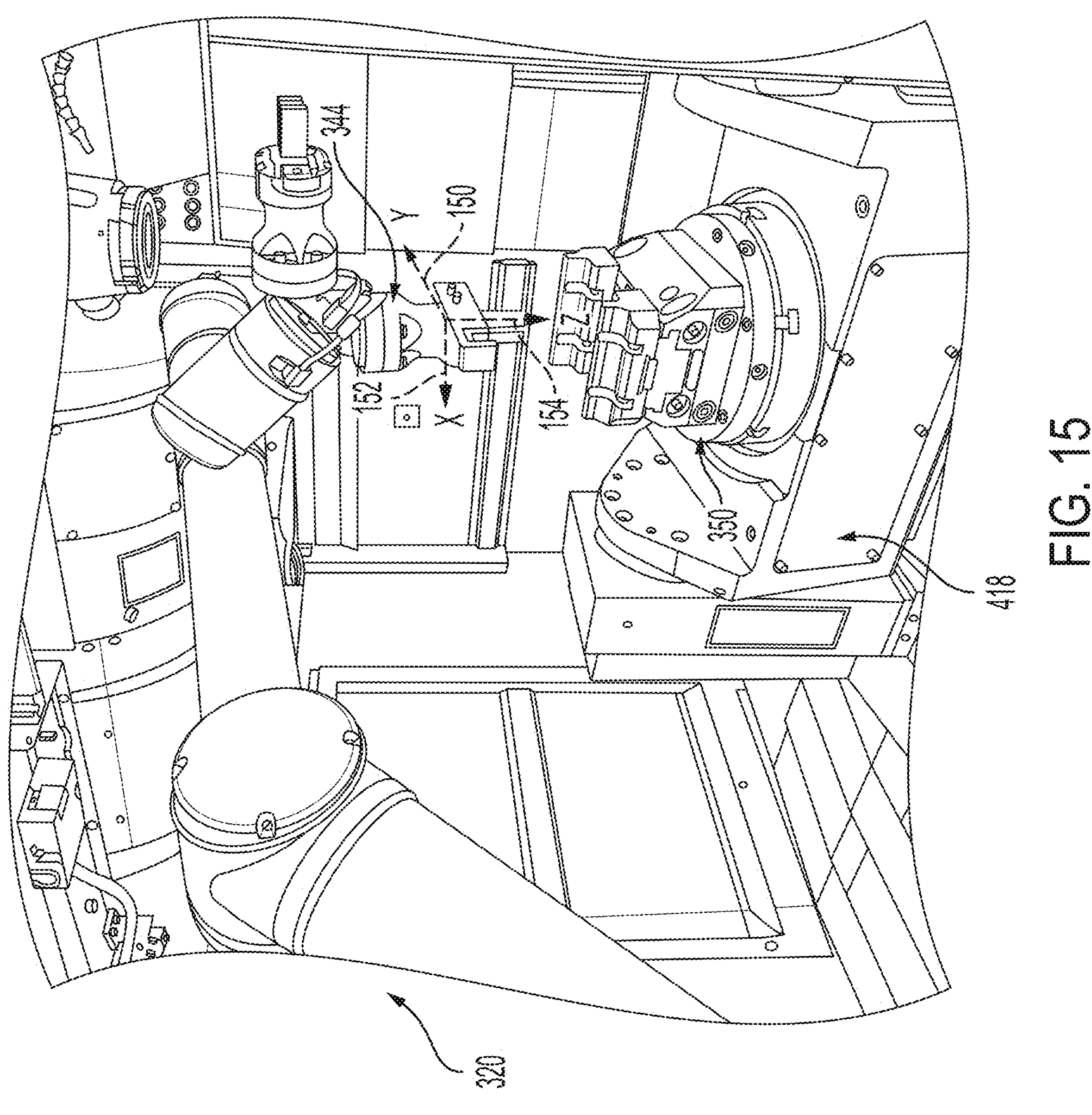
FIG. 15 is a perspective view of a robot in an in-machine position.

In the example depicted in FIG. 15, gripper 344 is shown to be rotated about x-axis 152 of the gripper coordinate system such that it is perpendicular to the bottom of holding fixture 350. In this example, a trunnion 418 on which holding fixture 350 is mounted has been rotated slightly about x-axis 152. Thus, in the process of moving gripper 344 near the center of holding fixture 350, gripper 344 needs to have the freedom to be rotated about the x-axis 152 (i.e., box 376 shown in FIG. 8 needs to be checked when entering free-drive mode).

Figure 16:
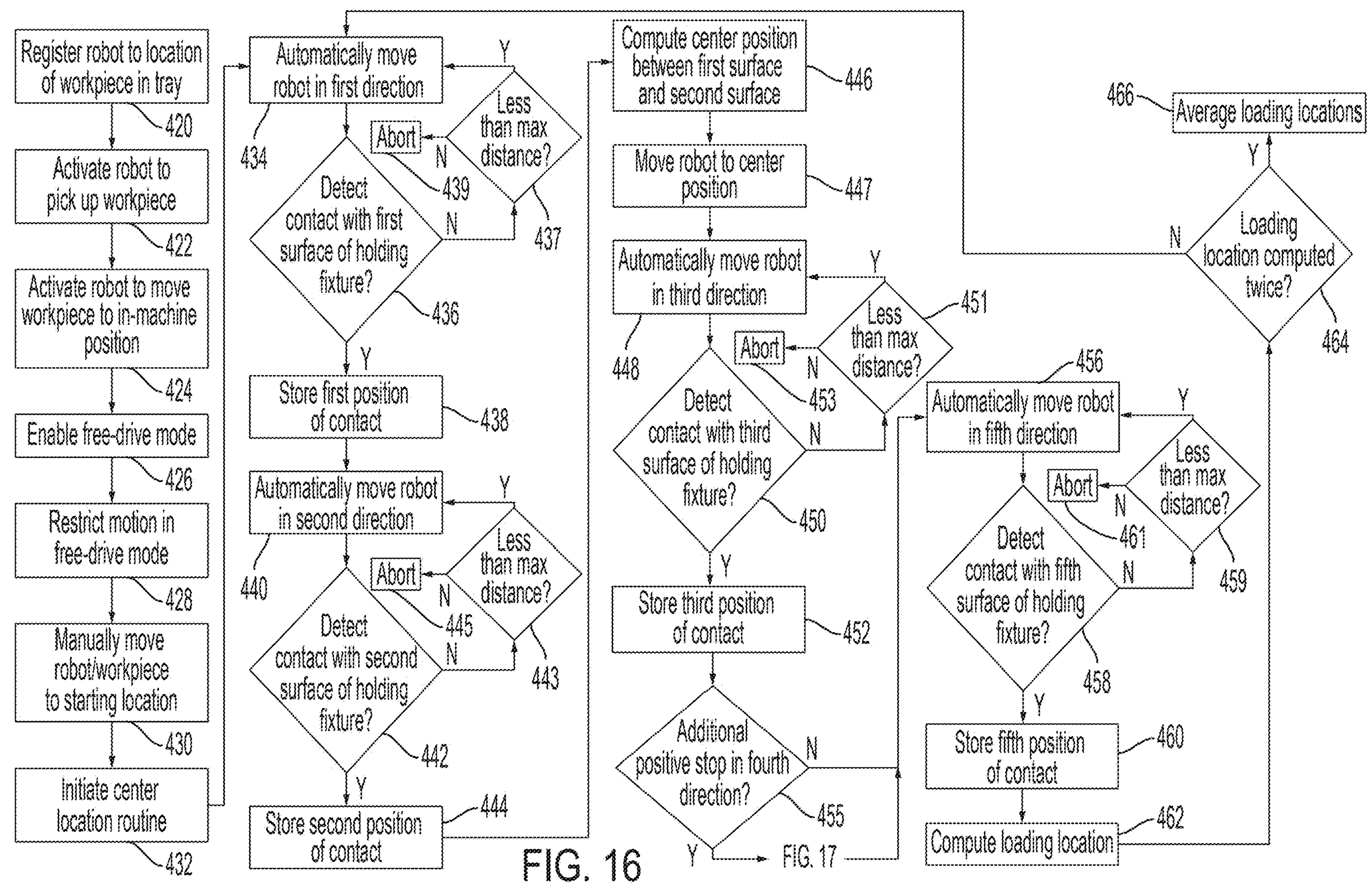
FIGS. 16 and 17 are flow charts depicting a method of determining a loading location of a workpiece according to the present disclosure.
Figure 17:
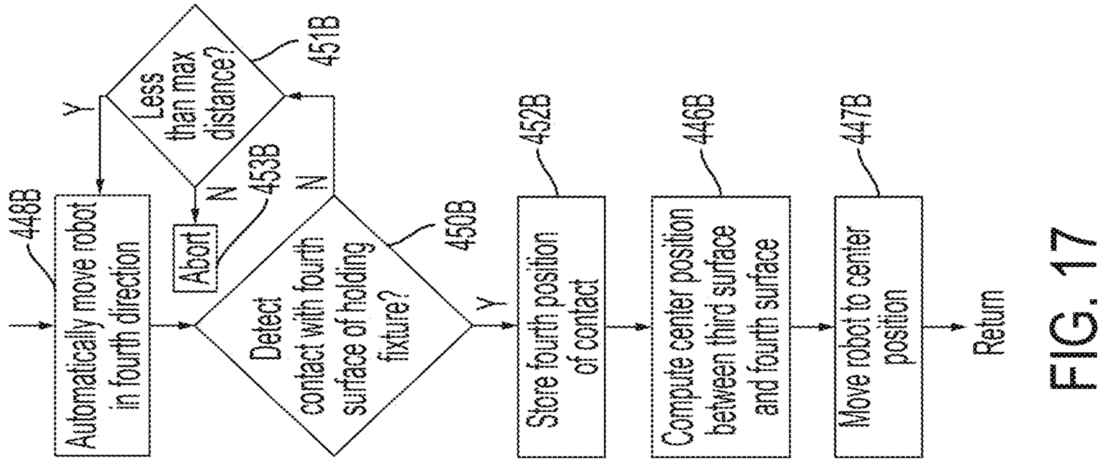

Referring now to FIGS. 16 and 17, a method of determining the loading location of a workpiece 316 according to the present disclosure is depicted in flow chart form. As shown, the initial step 420 represents the process of registering robot 320 to the location of a workpiece 316 in tray 312 (FIG. 4) as described above. At step 422, the operator activates controller 310 to cause robot 320 to pick up workpiece 316. At step 424, controller 310 causes robot 320 to move workpiece 316 to the in-machine position as described above. After robot 320 is moved to the in-machine position, controller 310 enables the free-drive mode described above and instructs the operator to move gripper 344 of robot (and therefore workpiece 316) to near the center of holding fixture 350 (i.e., the starting location). At step 428, controller 310 presents interface 366 on display 315 which permits the operator to select/restrict axes of motion and movement about those axes permitted when robot 320 is in free-drive mode as described above with reference to FIGS. 8 and 11. At step 430, the operator moves gripper 344 and workpiece 316 to the starting location. At step 432, the operator activates the center location routine on controller 310.

In the depicted example, the center location routine causes robot 320 to move along the x-axis, the y-axis, and the z-axis relative to the gripper coordinate system (or in some embodiments, the base coordinate system) until force sensor 392 senses contact with the surfaces of holding fixture 350 in the manner described above. At step 434, controller 310 moves robot 320 in a first direction (e.g., along the y-axis). At step 436, controller 310 determines whether force sensor 392 senses contact with a first surface of holding fixture 350 (e.g., side surface 360 of one jaw 354). If not, then the process checks at step 437 whether robot 320 has moved less than a maximum distance (i.e., a safety limit such as 10 mm), which if exceeded results in abortion of the program (step 439). If controller 310 determines that force sensor 392 has not sensed contact and the maximum distance has not been exceeded, then the process returns to step 434 and controller 310 continues to move robot 320 in the first direction. If contact is sensed by force sensor 392, then controller 310 stops movement in the first direction and stores the first position of contact in memory 311 at step 438. At step 440, controller 310 causes robot 320 to move in a second direction (e.g., a direction opposite to the first direction). At step 442, controller 310 determines whether force sensor 392 senses contact with a second surface of holding fixture 350 (e.g., side surface 360 of the other jaw 354). If not, then the process checks at step 443 whether robot 320 has moved less than a maximum distance (i.e., a safety limit such as 10 mm), which if exceeded results in abortion of the program (step 445). If controller 310 determines that force sensor 392 has not sensed contact and the maximum distance has not been exceeded, then the process returns to step 440 and controller 310 continues to move robot 320 in the second direction. If contact is sensed by force sensor 392, then controller 310 stops movement in the second direction and stores the second position of contact in memory 311 at step 444. At step 446, controller 310 computes the center position between the first surface of holding fixture 350 and the second surface using the stored first position of contact and the stored second position of contact.

Next, controller 310 moves robot 320 to the calculated center position at step 447. Then, controller 310 moves robot 320 in a third direction (e.g., along the x-axis) at step 448. At step 450, controller 310 determines whether force sensor 392 senses contact with a third surface of holding fixture 350 (e.g., end surface 362 of jaws 354). If not, then the process checks at step 451 whether robot 320 has moved less than a maximum distance (i.e., a safety limit such as 10 mm), which if exceeded results in abortion of the program (step 453). If controller 310 determines that force sensor 392 has not sensed contact and the maximum distance has not been exceeded, then the process returns to step 448 and controller 310 continues to move robot 320 in the third direction. If contact is sensed by force sensor 392, then controller 310 stops movement in the third direction and stores the third position of contact in memory 311 at step 452.

At step 455, controller 310 determines whether the holding fixture 350 has another positive stop in a fourth direction, which is opposite the third direction in certain embodiments. This information would be programmed into controller 310 during set-up. For example, in configurations of holding fixtures 350 such as depicted in FIGS. 7, 9, 10 and 12, where holding fixture 350 includes only one end surface 362 or one positive stop along the x-axis, the center location routine of FIG. 16 continues to step 456. In other configurations such as holding fixture 350 depicted in FIG. 6 which forms a pocket when jaws 354 are closed providing two end surfaces 362 along the x-axis, controller 310 will be programmed to measure both end surfaces 362 (i.e., there is more than one positive stop along the x-axis). As such, the center location routine proceeds to FIG. 17 and controller 310 moves robot 320 in a fourth direction (e.g., along the x-axis opposite the third direction) at step 448B. At step 450B, controller 310 determines whether force sensor 392 senses contact with a fourth surface of holding fixture 350 (e.g., a second end surface 362 of jaws 354). If not, then the process checks at step 451B whether robot 320 has moved less than a maximum distance (i.e., a safety limit such as 10 mm), which if exceeded results in abortion of the program (step 453B). If controller 310 determines that force sensor 392 has not sensed contact and the maximum distance has not been exceeded, then the process returns to step 448B and controller 310 continues to move robot 320 in the third direction. If contact is sensed by force sensor 392, then controller 310 stops movement in the fourth direction and stores the fourth position of contact in memory 311 at step 452B. At step 446B, controller 310 computes the center position between the third surface of holding fixture 350 and the fourth surface using the stored third position of contact and the stored fourth position of contact. Next, controller 310 moves robot 320 to the calculated center position at step 447B and the process returns to FIG. 16.

At step 456, controller 310 moves robot 320 in a fifth direction (e.g., along the z-axis toward the bottom of holding fixture 350). At step 458, controller 310 determines whether force sensor 392 senses contact with a fifth surface of holding fixture 350 (e.g., bottom surface 358 of holding fixture 350). If not, then the process checks at step 459 whether robot 320 has moved less than a maximum distance (i.e., a safety limit such as 10 mm), which if exceeded results in abortion of the program (step 461). If controller 310 determines that force sensor 392 has not sensed contact and the maximum distance has not been exceeded, then the process returns to step 456 and controller 310 continues to move robot 320 in the fifth direction. If contact is sensed by force sensor 392, then controller 310 stops movement in the fifth direction and stores the fifth position of contact in memory 311 at step 460. At step 462, controller 310 computes the three-dimensional center point of holding fixture 350 (i.e., the loading location) using the stored first, second, third, fourth (if applicable) and fifth positions of contact.

At step 464, controller 310 determines whether the loading location has been computed twice. It should be understood, however, that the number of measurements and calculations of the loading location may be fewer than two or more than two, and is configurable by the operator. If not, the process returns to step 434 to repeat the steps of sensing contact with the first, second, third, fourth (if applicable) and fifth surfaces of holding fixture 350 as described above. In this example, when the locating location has been computed twice, controller 310 computes an average of the two results to establish the final loading location at step 466. As described above, when the loading location computation is complete, controller 310 causes robot to load workpiece 316 onto holding fixture 350, commands holding fixture 350 to clamp onto workpiece 316 and causes robot 320 to exit CNC machine 100.

It should be understood that certain steps of the method depicted in FIGS. 16 and 17 may be optional, and the steps may be performed in a different order is certain embodiments. For example, in one embodiment steps associated with detecting the fourth position of contact (i.e., steps 448B, 450B, 452B, 451B, 453B, 446B and 447B) may be omitted. In other embodiments where holding fixture 350 is configured as depicted in FIG. 14 with no positive stop in the x-direction, the steps associated with detecting the third position of contact and the fourth position of contact (i.e., steps 448, 450, 452, 451, 453, 455, 448B, 450B, 452B, 451B, 453B, 446B and 447B) may be omitted. As another example, the steps of determining whether the loading location was computed twice (step 464) and averaging the results (step 466) may be omitted or increased. Other variations are contemplated by the present disclosure.

Figure 18:
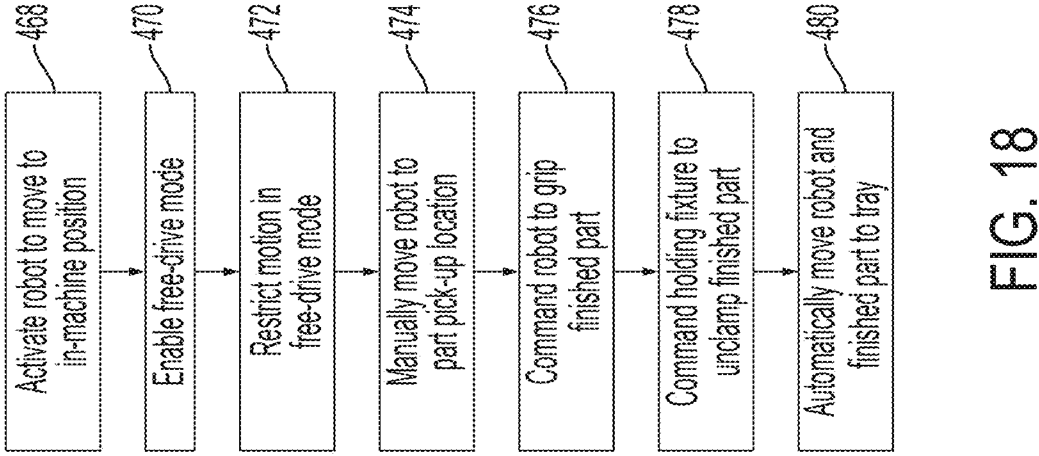
FIG. 18 is a flow chart depicting a part removal routine according to the present disclosure.

After the operator activates CNC machine 100 to machine workpiece 316 to form a first finished part 318, the operator initiates the part removal routine on controller 310 as described above. The part removal routine is depicted in flow chart form in FIG. 18. As shown, at step 468, controller 310 causes robot 320 to reenter CNC machine 100 and move to the in-machine position described above. Controller 310 then places robot 320 in free-drive mode at step 470. Controller 310 presents the operator at step 472 with interface 366 described above to permit the operator to select/restrict the movements of robot 320 when in free-drive mode. After selecting/restricting the movements of robot 320, the operator manually moves gripper 344 of robot 320 to the part pick-up location at step 474. Next, at step 476, controller 310 commands robot 320 to grip finished part 318 between fingers 346, which causes robot 320 to automatically center itself on finished part 318 as it remains in free-drive mode. After the operator commands holding fixture 350 to unclamp finished part 318 at step 478, controller 310 commands robot 320 at step 480 to remove finished part 318 from holding fixture 350 and place finished part 318 onto tray 312 as described above. After the part removal routine is complete, robot 320 is completely programmed to load workpieces 316 into holding fixture 318 and unload finished parts 318.

After robot 320 is fully programmed as described above, the computed loading location and finished part removal locations may be stored in a job file which includes the CNC program and the robot job program. This job file may be retrieved for future use to re-run additional workpieces 316 if the robot 320 and holding fixture 350 configurations have not changed. In this way, an operator does not need to repeat the steps described above for determining the loading location and finished part removal location.

One of ordinary skill in the art will realize that the embodiments provided can be implemented in hardware, software, firmware, and/or a combination thereof. For example, the controllers disclosed herein may form a portion of a processing subsystem including one or more computing devices having memory, processing, and communication hardware. The controllers may be a single device or a distributed device, and the functions of the controllers may be performed by hardware and/or as computer instructions on a non-transient computer readable storage medium. For example, the computer instructions or programming code in the controller may be implemented in any viable programming language such as C, C++, C#, python, JAVA or any other viable high-level programming language, or a combination of a high-level programming language and a lower level programming language.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

It should be understood that the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A system for determining a loading location of a workpiece relative to a holding fixture, comprising:

a robot configured to grip a workpiece and including a sensor; and a controller communicatively coupled to the robot, the controller having a memory including a plurality of instructions that when executed by the controller cause the controller to:

activate the robot to grip the workpiece;

enable a free-drive mode of operation of the robot to permit an operator to move the workpiece to a starting location adjacent to a center of the holding fixture; and respond to an input of the operator by executing a center location routine;

wherein the center location routine includes:

causing the robot to automatically move in a first direction until the sensor senses contact at a first position of contact between the workpiece and a first surface of the holding fixture;

causing the robot to automatically move in a second direction until the sensor senses contact at a second position of contact between the workpiece and a second surface of the holding fixture;

causing the robot to automatically move in a third direction until the sensor senses contact at a third position of contact between the workpiece and a third surface of the holding fixture; and computing a three-dimensional center point of the holding fixture representing the loading location of the workpiece using the first position of contact, the second position of contact and the third position of contact.

2. The system of claim 1, wherein the center location routine further includes causing the robot to automatically move in a fourth direction until the sensor senses contact at a fourth position of contact between the workpiece and a fourth surface of the holding fixture, and computing the three-dimensional center point of the holding fixture using the first position of contact, the second position of contact, the third position of contact and the fourth position of contact.

3. The system of claim 2, wherein the center location routine further includes causing the robot to automatically move in a fifth direction until the sensor senses contact at a fifth position of contact between the workpiece and a fifth surface of the holding fixture, and computing the three-dimensional center point of the holding fixture using the first position of contact, the second position of contact, the third position of contact, the fourth position of contact and the fifth position of contact.

4. The system of claim 1, wherein the sensor is a force sensor coupled to an arm of the robot.

5. The system of claim 1, wherein the plurality of instructions when executed by the controller further cause the controller to cause the robot to move the workpiece to an in-machine position.

6. The system of claim 1, wherein the plurality of instructions when executed by the controller further cause the controller to present an interface on a display of the controller which permits the operator to select axes of motion permitted for the robot when being moved while in free-drive mode.

7. The system of claim 6, wherein the interface further permits the operator to select which axes, if any, the robot is permitted to be rotated about when being moved in free-drive mode.

8. The system of claim 1, wherein the first surface is a first side surface of a first jaw of the holding fixture, the second surface is a second side surface of a second jaw of the holding fixture, and the third surface is a bottom surface of the holding fixture.

9. The system of claim 1, wherein the second direction is opposite the first direction and the third direction is perpendicular to the first direction and the second direction.

10. The system of claim 1, wherein the center location routine further includes causing the robot to automatically move to a center position between the first position of contact and the second position of contact.

11. The system of claim 1, wherein the plurality of instructions when executed by the controller further cause the controller to execute the center location routine twice, thereby computing the loading location and a second loading location, and the center location routine further includes computing a final loading location by averaging the load location and the second loading location.

12. The system of claim 1, wherein the plurality of instructions when executed by the controller further cause the controller to execute a part removal routine after the workpiece has been formed into a finished part, the part removal routine causes the controller to:

enable the free-drive mode of the robot to permit the operator to move the robot to a part pick-up location;

respond to an input of the operator by commanding the robot to grip the finished part and commanding the holding fixture to unclamp the finished part; and move the robot to remove the finished part from the holding fixture.

13. The system of claim 12, wherein the part removal routine further causes the controller to move the robot to an in-machine position.

14. A method of determining a loading location of a workpiece relative to a holding fixture, comprising:

activating, by a controller, a robot to grip the workpiece;

enabling, by the controller, a free-drive mode of operation of the robot to permit an operator to move the workpiece to a starting location adjacent to a center of the holding fixture;

causing, by the controller, the robot to automatically move in a first direction until a sensor coupled to the robot senses contact at a first position of contact between the workpiece and a first surface of the holding fixture;

causing, by the controller, the robot to automatically move in a second direction until the sensor senses contact at a second position of contact between the workpiece and a second surface of the holding fixture;

causing, by the controller, the robot to automatically move in a third direction until the sensor senses contact at a third position of contact between the workpiece and a third surface of the holding fixture; and computing, by the controller, a three-dimensional center point of the holding fixture representing the loading location of the workpiece using the first position of contact, the second position of contact and the third position of contact.

15. The method of claim 14, further comprising causing the robot to automatically move in a fourth direction until the sensor senses contact at a fourth position of contact between the workpiece and a fourth surface of the holding fixture, and computing the three-dimensional center point of the holding fixture includes using the first position of contact, the second position of contact, the third position of contact and the fourth position of contact.

16. The method of claim 15, further comprising causing the robot to automatically move in a fifth direction until the sensor senses contact at a fifth position of contact between the workpiece and a fifth surface of the holding fixture, and computing the three-dimensional center point of the holding fixture includes using the first position of contact, the second position of contact, the third position of contact, the fourth position of contact and the fifth position of contact.

17. The method of claim 14, wherein the sensor is a force sensor coupled to an end of arm of the robot.

18. The method of claim 14, further comprising presenting, by the controller, an interface on a display of the controller which permits the operator to select axes of motion permitted for the robot when being moved while in free-drive mode.

19. The method of claim 14, wherein the first surface is a first side surface of a first jaw of the holding fixture, the second surface is a second side surface of a second jaw of the holding fixture, and the third surface is a bottom surface of the holding fixture.

20. The method of claim 14, wherein the second direction is opposite the first direction and the third direction is perpendicular to the first direction and the second direction.

21. The method of claim 14, further comprising storing the computed loading location in a job file and retrieving and executing the job file to load additional workpieces in the holding fixture without repeating the enabling, causing and computing steps.

22. A non-transitory, computer-readable medium storing instructions that, when executed by a controller, cause the controller to:

activate a robot to grip a workpiece;

enable a free-drive mode of operation of the robot to permit an operator to move the workpiece to a starting location adjacent to a center of a holding fixture;

cause the robot to automatically move in a first direction until a sensor coupled to the robot senses contact at a first position of contact between the workpiece and a first surface of the holding fixture;

cause the robot to automatically move in a second direction until the sensor senses contact at a second position of contact between the workpiece and a second surface of the holding fixture;

cause the robot to automatically move in a third direction until the sensor senses contact at a third position of contact between the workpiece and a third surface of the holding fixture; and compute a three-dimensional center point of the holding fixture representing a loading location of the workpiece using the first position of contact, the second position of contact and the third position of contact.

23. The non-transitory, computer-readable medium of claim 22, wherein the instructions further cause the controller to cause the robot to automatically move in a fourth direction until the sensor senses contact at a fourth position of contact between the workpiece and a fourth surface of the holding fixture, and compute the three-dimensional center point of the holding fixture using the first position of contact, the second position of contact, the third position of contact and the fourth position of contact.

24. The non-transitory, computer-readable medium of claim 23, wherein the instructions further cause the controller to cause the robot to automatically move in a fifth direction until the sensor senses contact at a fifth position of contact between the workpiece and a fifth surface of the holding fixture, and compute the three-dimensional center point of the holding fixture using the first position of contact, the second position of contact, the third position of contact, the fourth position of contact and the fifth position of contact.

* * * * *